United States Patent
Yun et al.

(10) Patent No.: US 9,939,101 B2
(45) Date of Patent: Apr. 10, 2018

(54) FLEXIBLE APPARATUS AND METHOD FOR CONTROLLING FLEXIBLE APPARATUS

(71) Applicant: Samsung Electronics Co. Ltd., Suwon-si, Gyeonggi-do (KR)

(72) Inventors: Il-kook Yun, Suwon-si (KR); Geun-Ho Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 197 days.

(21) Appl. No.: 13/974,612

(22) Filed: Aug. 23, 2013

(65) Prior Publication Data

US 2014/0054438 A1 Feb. 27, 2014

(30) Foreign Application Priority Data

Aug. 23, 2012 (KR) .................. 10-2012-0092623

(51) Int. Cl.
| | | |
|---|---|---|
| F16M 13/00 | (2006.01) | |
| G09G 3/20 | (2006.01) | |
| G06F 1/16 | (2006.01) | |
| G06F 3/041 | (2006.01) | |

(52) U.S. Cl.
CPC ......... *F16M 13/005* (2013.01); *G06F 1/1652* (2013.01); *G06F 3/0414* (2013.01); *G09G 3/20* (2013.01); *G09G 2340/0464* (2013.01); *G09G 2380/02* (2013.01)

(58) Field of Classification Search
CPC .... G06F 1/1652; G06F 3/014; G09G 2380/02
See application file for complete search history.

(56) References Cited

U.S. PATENT DOCUMENTS

| | | | |
|---|---|---|---|
| 6,639,578 B1 | 10/2003 | Comiskey et al. | |
| 7,990,513 B2 | 8/2011 | Belyaev | |
| 8,490,860 B2* | 7/2013 | Cohen | G06F 1/1601 235/375 |
| 8,581,859 B2 | 11/2013 | Okumura et al. | |
| 9,177,501 B2 | 11/2015 | Moriwaki | |
| 2007/0222935 A1 | 9/2007 | Belyaev | |
| 2008/0303782 A1* | 12/2008 | Grant et al. | 345/156 |
| 2010/0011291 A1 | 1/2010 | Nurmi | |
| 2010/0056223 A1 | 3/2010 | Choi et al. | |
| 2010/0060548 A1 | 3/2010 | Choi et al. | |
| 2010/0117975 A1 | 5/2010 | Cho | |
| 2010/0162109 A1 | 6/2010 | Chatterjee et al. | |
| 2010/0164888 A1 | 7/2010 | Okumura et al. | |
| 2010/0188422 A1 | 7/2010 | Shingai et al. | |

(Continued)

FOREIGN PATENT DOCUMENTS

| | | |
|---|---|---|
| CN | 102087824 A | 6/2011 |
| EP | 2 166 443 A2 | 3/2010 |

(Continued)

*Primary Examiner* — Robin Mishler
(74) *Attorney, Agent, or Firm* — Jefferson IP Law, LLP

(57) ABSTRACT

A flexible apparatus is provided. The flexible apparatus includes a sensor configured to detect bending of the flexible apparatus, a bending holder configured to maintain a bending state of the flexible apparatus, and, a controller configured to control operations of the flexible apparatus, wherein when a predetermined input is received while the flexible apparatus is manipulated, the controller controls the bending holder to maintain the bending state of the flexible apparatus.

17 Claims, 21 Drawing Sheets

(56) References Cited

U.S. PATENT DOCUMENTS

| | | | |
|---|---|---|---|
| 2010/0283727 A1* | 11/2010 | Jiang | G06F 3/017 345/156 |
| 2011/0134144 A1 | 6/2011 | Moriwaki | |
| 2011/0188189 A1* | 8/2011 | Park et al. | 361/679.05 |
| 2012/0078999 A1 | 3/2012 | Andrew et al. | |
| 2012/0235894 A1* | 9/2012 | Phillips | G09G 3/36 345/156 |
| 2012/0313862 A1 | 12/2012 | Ko et al. | |
| 2013/0169520 A1* | 7/2013 | Cho | G06F 3/0488 345/156 |
| 2013/0197819 A1* | 8/2013 | Vanska et al. | 702/33 |

FOREIGN PATENT DOCUMENTS

| | | |
|---|---|---|
| EP | 2 315 186 A2 | 4/2011 |
| JP | 2003-280546 A | 10/2003 |
| JP | 2003-330384 A | 11/2003 |
| JP | 2010-157060 A | 7/2010 |
| JP | 2010-529555 A | 8/2010 |
| JP | 2012-256019 A | 12/2012 |
| KR | 10-2011-0006787 A | 1/2011 |
| KR | 10-1097842 B1 | 12/2011 |
| RU | 2318230 C2 | 2/2008 |
| WO | 2008-150600 A1 | 12/2008 |
| WO | 2013114277 A2 | 8/2013 |

\* cited by examiner

FLEXIBLE APPARATUS AND METHOD FOR CONTROLLING FLEXIBLE APPARATUS

CROSS-REFERENCE TO RELATED APPLICATION(S)

This application claims the benefit under 35 U.S.C. § 119(a) of a Korean patent application filed on Aug. 23, 2012 in the Korean Intellectual Property Office and assigned Serial No. 10-2012-0092623, the entire disclosure of which is hereby incorporated by reference.

TECHNICAL FIELD

The present disclosure relates to a flexible apparatus and a method for controlling of a flexible apparatus. More particularly, the present disclosure relates to a flexible apparatus which can have a shape thereof changed, and a method for controlling the same.

BACKGROUND

In general, flexible display apparatuses refer to image display apparatuses that are implemented by generating a flexible substrate using plastics or a polymer film. Such a flexible display apparatus may be implemented as a Liquid Crystal Display (LCD), an Organic Light Emitting Diode (OLED), electronic ink e-paper, or the like. Because such a flexible display is made by substituting a related-art glass substrate with elastic material, the flexible display can be bent or rolled like paper and is easy to carry.

However, the flexible display apparatus according to the related art is merely bent by a human force. As a result, if the force applied to the flexible display apparatus is not maintained, the flexible display apparatus returns to the original shape thereof due to the elasticity of the flexible display. Therefore, the user is inconvenienced by the return of the flexible display apparatus to the original shape thereof when the user places the flexible display apparatus in a desired shape and wants the flexible display apparatus to hold the shape.

Accordingly, there is a need for a method for holding a flexible display apparatus in a bending or a manipulated state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a flexible apparatus which can have its shape changed, and a method for controlling the same.

Aspects of the present disclosure are to provide a flexible apparatus, which, when a predetermined user manipulation is input after the flexible apparatus is manipulated, can hold the flexible apparatus in the bending state, and a method for controlling of the flexible apparatus.

In accordance with an aspect of the present disclosure, a flexible apparatus is provided. The flexible apparatus includes a sensor configured to detect bending of the flexible apparatus, a bending holder configured to maintain a bending state of the flexible apparatus, and a controller configured to control operations of the flexible apparatus, wherein when a predetermined input is received while the flexible apparatus is manipulated, the controller configured controls the bending holder to maintain the bending state of the flexible apparatus.

In accordance with an aspect of the present disclosure, the flexible apparatus may further include a storage configured to store information relating to the bending state of the flexible apparatus, and, when the flexible apparatus is manipulated, the controller may store the information relating to the bending state in the storage, and, when the predetermined input is received, the controller may control to maintain the bending state of the flexible apparatus using the stored information.

In accordance with an aspect of the present disclosure, the information relating to the bending state may include at least one of a bending area, a bending angle, and a bending direction of the flexible apparatus.

In accordance with an aspect of the present disclosure, when the flexible apparatus is bent and then is re-bent in a direction opposite to a direction in which the flexible apparatus is bent within a predetermined time, the controller may control to maintain the bending state of the flexible apparatus.

In accordance with an aspect of the present disclosure, when a first bending manipulation is performed in a first direction in which a center area of the flexible apparatus curves upwardly or downwardly, and a second bending manipulation is performed on an edge area of the flexible apparatus in a second direction which is opposite to the first direction within a predetermined time, the controller may control to maintain the bending state of the flexible apparatus.

In accordance with an aspect of the present disclosure, when an unfixing command is input while the flexible apparatus is bent, the controller may control the bending holder to return the flexible apparatus to a flat state.

In accordance with an aspect of the present disclosure, the unfixing command may be input by at least one of a button manipulation to select a button provided on a body of the flexible apparatus and a bending manipulation to bend a predetermined area of the flexible apparatus.

In accordance with an aspect of the present disclosure, the flexible apparatus may further include a bendable display, and, when the flexible apparatus is fixed, the controller may split a display area of the bendable display into a plurality of display areas according to the bending state of the flexible apparatus, and may display a screen on each of the plurality of display areas.

In accordance with another aspect of the present disclosure, a method for controlling of a flexible apparatus is provided. The method includes detecting bending of the flexible apparatus, and, when a predetermined input is received while the flexible apparatus is manipulated, controlling to maintain a bending state of the flexible apparatus.

In accordance with an aspect of the present disclosure, the controlling may include storing information relating to the bending state of the flexible apparatus, and when the predetermined input is received, controlling to maintain the bending state of the flexible apparatus using the stored information.

In accordance with an aspect of the present disclosure, the information relating to the bending state may include at least one of a bending area, a bending angle, and a bending direction of the flexible apparatus.

In accordance with an aspect of the present disclosure, the controlling to maintain the bending state of the flexible apparatus may include, when the flexible apparatus is bent and then is re-bent in a direction opposite to a direction in which the flexible apparatus is bent within a predetermined time, controlling to maintain the bending state of the flexible apparatus.

In accordance with an aspect of the present disclosure, the controlling to maintain the bending state of the flexible apparatus may include, when a first bending manipulation is performed in a first direction in which a center area of the flexible apparatus curves upwardly or downwardly, and a second bending manipulation is performed on an edge area of the flexible apparatus in a second direction which is opposite to the first direction within a predetermined time, controlling to maintain the bending state of the flexible apparatus.

In accordance with an aspect of the present disclosure, the controlling to maintain the bending state of the flexible apparatus may include, when an unfixing command is input while the flexible apparatus is bent, controlling to return the flexible apparatus to a flat state.

In accordance with an aspect of the present disclosure, the unfixing command may be input by at least one of a button manipulation to select a button provided on a body of the flexible apparatus and a bending manipulation to bend a predetermined area of the flexible apparatus.

In accordance with an aspect of the present disclosure, the flexible apparatus may include a bendable display, and the controlling to maintain the bending state of the flexible apparatus may include, when the flexible apparatus is fixed, splitting a display area of the bendable display into a plurality of display areas according to the bending state of the flexible apparatus, and displaying a screen on each of the plurality of display areas.

According to the various embodiments of the present disclosure as described above, the user may hold the bending state of the flexible apparatus using a manipulation that is easy to perform.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
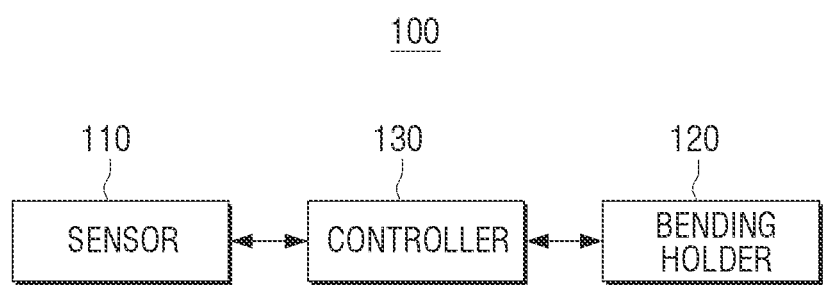
FIG. 1 is a block diagram illustrating a configuration of a flexible apparatus according to an embodiment of the present disclosure.

FIG. 1 is a block diagram illustrating a configuration of a flexible apparatus according to an embodiment of the present disclosure.

Referring to FIG. 1, a flexible apparatus 100 includes a sensor 110, a bending holder 120, and a controller 130.

According to various embodiments of the present disclosure, the flexible apparatus 100 of FIG. 1 may be implemented by using various types of apparatuses which can be easily carried and have a display function, such as a mobile phone including a smartphone, a Portable Multimedia Player (PMP), a Personal Digital Assistant (PDA), a portable game console, a tablet PC, and a navigation system, and/or the like. Also, the flexible apparatus 100 may be implemented by using a stationary type apparatus such as a monitor, a Television (TV), a kiosk, and/or the like in addition to the portable apparatus.

The flexible apparatus 100 may be made of flexible material such that the flexible apparatus 100 can be bent by external force and thereby have the shape thereof changed. The flexible apparatus 100 may detect a bending according to various methods. Hereinafter, a method for detecting bending of the flexible apparatus 100 will be explained with reference to FIGS. 2A to 4.

FIGS. 2A, 2B, 2C, 2D, 3A, 3B, and 4 are views to illustrate an example of a method for detecting bending of a flexible apparatus according to an embodiment of the present disclosure.

Referring to FIGS. 2A, 2B, 2C, 2D, 3A, 3B, and 4, the sensor 110 detects bending of the flexible apparatus 100. The bending recited herein refers to a state in which the flexible apparatus 100 is bent.

In order to detect the bending of the flexible apparatus 100, the sensor 110 may include a bend sensor which is disposed on one surface such as a front surface or a rear surface of the flexible apparatus 100, or a bend sensor which is disposed on opposite surfaces of the flexible apparatus 100.

The bend sensor recited herein refers to a sensor that can be bent and that has a resistance value which varies according to a degree of bending. The bending sensor may be implemented in various forms such as an optical fiber bending sensor, a pressure sensor, a strain gauge, and/or the like.

Referring to FIGS. 2A to 2D, are views illustrating a pattern in which bend sensors are arranged according to an embodiment of the present disclosure are provided.

Figure 2A:
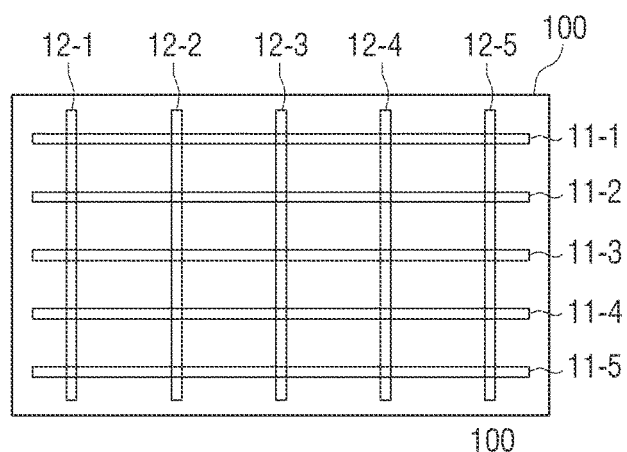
FIGS. 2A, 2B, 2C, 2D, 3A, 3B, and 4 are views to illustrate an example of a method for detecting bending of a flexible apparatus according to an embodiment of the present disclosure.

FIG. 2A illustrates an example of a plurality of bar-shaped bend sensors which are arranged in the flexible apparatus 100 in a vertical direction and a horizontal direction in a grid pattern. Specifically, the bend sensor includes bend sensors 11-1 to 11-5 which are arranged in a first direction, and bend sensors 12-1 to 12-5 which are arranged in a second direction which is perpendicular to the first direction. The bend sensors are disposed away from one another by a predetermined distance.

As illustrated in FIG. 2A, five bend sensors (11-1 to 11-5, 12-1 or 12-5) are arranged in each of the horizontal direction and the vertical direction in a grid formation. However, such a configuration is merely an example and the number of bend sensors and lengths of the bend sensors may be changed according to a size of the flexible apparatus 100. The bend sensors are arranged in the horizontal direction and the vertical direction to detect bending from the entire area of the flexible apparatus 100. Therefore, when only a part of the flexible apparatus is flexible or when the flexible apparatus needs to detect a bend from only a part of the apparatus, the bend sensor may be arranged in only a corresponding portion of the apparatus.

Referring to FIG. 2A, the bend sensor is embedded in the front surface of the flexible apparatus 100. However, such a configuration is merely an example and the bend sensor may be embedded in the rear surface of the flexible apparatus 100 or may be embedded in opposite surfaces.

In addition, according to various embodiments of the present disclosure, the shape, number, and location of bend sensors may be variously changed. For example, the flexible apparatus 100 may include a single bend sensor or a plurality of bend sensors which are connected to one another. The single bend sensor may detect one bending data, but may include a plurality of detecting channels to detect a plurality of bending data.

Figure 2B:
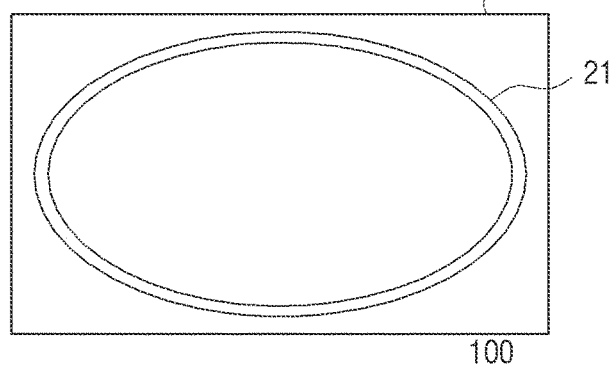

FIG. 2B illustrates an example of a single bend sensor which is disposed on one surface of the flexible apparatus 100. Referring to FIG. 2B, a bend sensor 21 may be disposed on the front surface of the flexible apparatus 100 in a circular form. However, such a configuration is merely an example and the bend sensor may be disposed on the rear surface of the flexible apparatus 100, and may be implemented in a form of a looped curve forming various polygons such as a quadrangle.

Figure 2C:
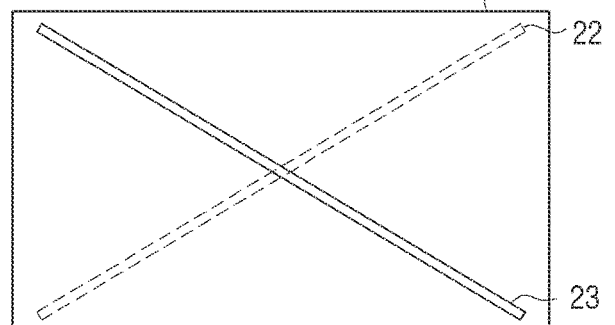

FIG. 2C illustrates two bend sensors which intersect. Referring to FIG. 2C, a first bend sensor 22 is disposed on a first surface of the flexible apparatus 100 in a first diagonal direction and a second bend sensor 23 is disposed on a second surface of the flexible apparatus 100 in a second diagonal direction.

Although line type bend sensors are used in the above-described various embodiments of the present disclosure, the sensor 110 may detect bending using a plurality of strain gages.

Figure 2D:
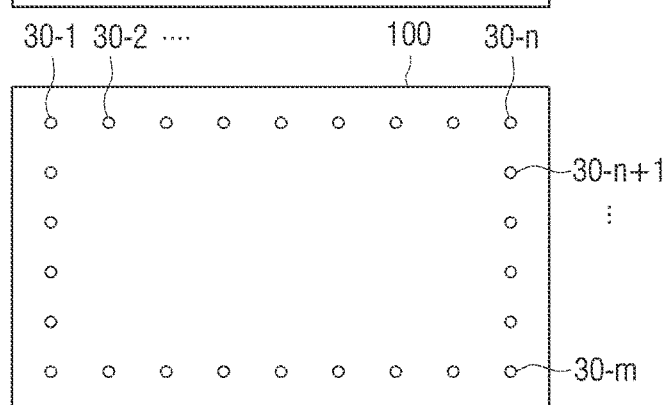

FIG. 2D illustrates a plurality of strain gages 30-1 to 30-$m$ which are arranged in the flexible apparatus 100. The strain gage uses metal or a semiconductor in which a resistance is changed according to an applied force, and detects deformation of a surface of an object to be measured according to a change in the resistance value. It is common that a material such as metal increases a resistance value when the length of such material is stretched by an external force, and decreases the resistance value when the length thereof is contracted. Accordingly, determination as to whether bending is performed (e.g., occurs) or not may be made by detecting a change in the resistance value.

Referring to FIG. 2D, a plurality of strain gages are arranged along an edge of the flexible apparatus 100. The number of strain gages may be changed according to a size and a shape of the flexible apparatus 100.

Hereinafter, a method in which the sensor 110 detects bending of the flexible apparatus 100 using the bend sensors which are arranged in a grid pattern, or the strain gages will be explained.

The bend sensors may be implemented by using an electric resistance sensor which uses an electric resistance, or a micro optical fiber sensor which uses a strain of an optical fiber. Hereinafter, the bend sensor will be explained with the assumption that the bend sensor is the electric resistance sensor for the convenience of explanation.

Figure 3A:
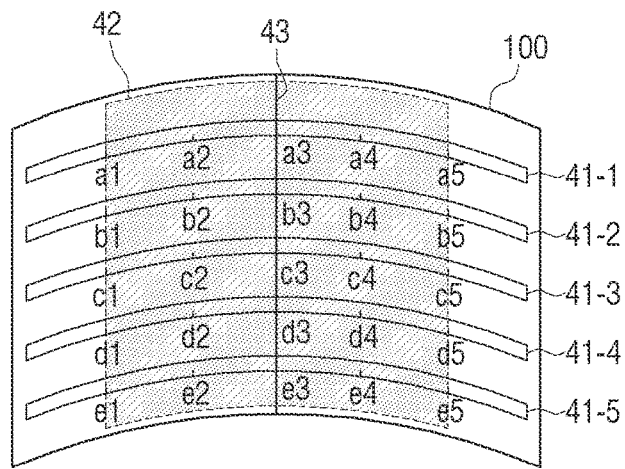
Figure 3B:
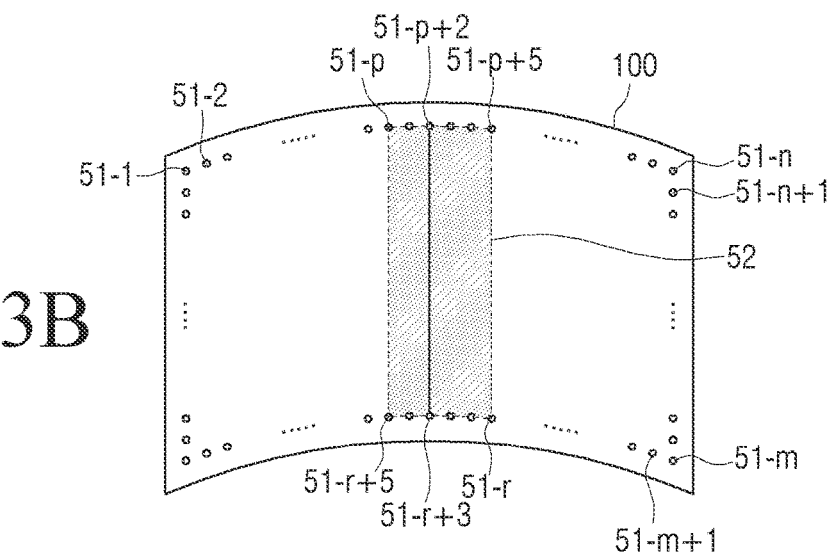

FIGS. 3A and 3B are views to illustrate a method for detecting bending of a flexible apparatus according to an embodiment of the present disclosure.

Referring to FIGS. 3A and 3B, when the flexible apparatus 100 is bent, the bend sensors, which are arranged on one surface or opposite surfaces of the flexible apparatus 100, are also bent. As a result, the bend sensors output resistance values corresponding to a magnitude of exerted tension.

For example, the sensor 110 detects the resistance value of the bend sensor using a level of a voltage applied to the bend sensor or a size of an electric current flowing in the bend sensor, and detects bending of the flexible apparatus 100 using the resistance value.

For example, when the flexible apparatus 100 is bent in the horizontal direction as shown in FIG. 3A, the bend sensors 41-1 to 41-5 which are embedded in the front surface of the flexible apparatus 100 are also bent. Consequently, the bend sensors 41-1 to 41-5 output resistance values according to a magnitude of exerted tension.

In this case, the magnitude of the tension increases in proportion to a degree of bending. When the flexible apparatus 100 is bent as shown in FIG. 3A, the greatest bending occurs in the center area. Accordingly, the greatest tension is exerted to center points $a3$, $b3$, $c3$, $d3$, and $e3$ of the bend sensors 41-1, 41-2, 41-3, 41-4, and 41-5, and accordingly, the bend sensors 41-1 to 41-5 have the greatest resistance value at the points $a3$, $b3$, $c3$, $d3$, and $e3$.

In contrast, the degree of bending gradually decreases toward the outside. Accordingly, the bend sensor 41-1 has smaller resistance values at positions increasingly further away from the point $a3$ to the left and right. The point $a1$ and a left area thereof and the point $a5$ and a right area thereof at which bending does not occur have the same values as before. The same is applied to the other bend sensors 41-2 to 41-5, and corresponding points $b1$ to $b5$, $c1$ to $c5$, $d1$ to $d5$, and $e1$ to $e5$.

The controller 130 may determine bending of the flexible apparatus 100 based on a result of detecting by the sensor 110. Specifically, the controller 130 may determine a location of a bending area, a size of the bending area, a number of bending areas, a size of a bending line, a location of the bending line, a number of bending lines, a direction of the bending line, a number of times that bending occurs, and/or the like, based on a relationship between the points at which a change in the resistance value is detected.

The bending area is an area in which the flexible display apparatus is bent. Specifically, because the bend sensor can also be bent by bending the flexible apparatus 100, all points at which the bend sensors output different resistance values from originals values may delineate a bending area. An area at which no change in the resistance value occurs may be delineated as a flat area at which bending does not occur.

When a distance between the points at which the change in the resistance value is detected lies within a predetermined distance, the sensor 110 detects the points as one bending area. On the other hand, when the distance between the points at which the change in the resistance value is detected lies beyond the predetermined distance, the sensor 110 delineates different bending areas with reference to these points.

As described above, in FIG. 3A, the resistance values from the points $a1$ to $a5$ of the bend sensor 41-1, from the points $b1$ to $b5$ of the bend sensor 41-2, from the points $c1$ to $c5$ of the bend sensor 41-3, from the points $d1$ to $d5$ of the bend sensor 41-4, and from the points $e1$ to $e5$ of the bend sensor 41-5 are different from the resistance values in the original state. In this case, the points at which the change in the resistance value is detected in each bend sensor 41-1 to 41-5 are located within a predetermined distance and are continuously arranged.

Accordingly, the controller 130 determines an area 42 which includes all of the points, from the points $a1$ to $a5$ of the bend sensor 41-1, from the points $b1$ to $b5$ of the bend sensor 41-2, from the points $c1$ to $c5$ of the bend sensor 41-3, from the points $d1$ to $d5$ of the bend sensor 41-4, and from the points $e1$ to $e5$ of the bend sensor 31-5, as one bending area.

The bending area may include a bending line. The bending line refers a line which connects the points at which the greatest resistance value is detected in each bending area. Accordingly, the controller 130 may determine a line which connects the points at which the greatest resistance value is detected in the bending area as a bending line.

For instance, in the case of FIG. 3A, a line 43 in the bending area 42, which connects the point $a3$ at which the greatest resistance value is output in the bend sensor 41-1, the point $b3$ at which the greatest resistance value is output in the bend sensor 41-2, the point $c3$ at which the greatest resistance value is output in the bend sensor 41-3, the point $d3$ at which the greatest resistance value is output in the bend sensor 41-4, and the point $e3$ at which the greatest resistance value is output in the bend sensor 41-5, may be delineated as a bending line. FIG. 3A illustrates the bending line which is formed in the center area of the display surface in the vertical direction.

FIG. 3A illustrates only the bend sensors that are arranged in the horizontal direction from among the bend sensors in the grid pattern to explain bending of the flexible apparatus 100 in the horizontal direction. For example, the sensor 110 may detect bending of the flexible apparatus 100 in the vertical direction using the same method as bending in the horizontal direction through the bend sensors which are arranged in the vertical direction. In addition, when the flexible apparatus 100 is bent in the diagonal direction, tension is exerted to all of the bend sensors which are arranged in the horizontal direction and the vertical direction. Therefore, the sensor 110 may detect bending of the flexible apparatus 100 in the diagonal direction based on the output values of the bend sensors which are arranged in the horizontal and vertical directions.

In contrast, according to various embodiments of the present disclosure, the sensor 110 may detect bending of the flexible apparatus 100 using a strain gage.

Specifically, when the flexible apparatus 100 is bent, a force is exerted to a strain gage which is arranged along an edge of the flexible apparatus 100 and a different resistance value is output from the strain gage according to a magnitude of the applied force. Accordingly, the controller 130 may determine a location of a bending area, a size of the bending area, a number of bending areas, a size of a bending line, a location of the bending line, a number of bending lines, a direction of the bending line, a number of times that bending occurs, and/or the like, based on the output value of the strain gage.

For example, as illustrated in FIG. 3B, when the flexible apparatus 100 is bent in the horizontal direction, a force is exerted to strain gages 51-$p$, . . . , 51-$p$+5, and 51-$r$, . . . , 51-$r$+5 which are arranged in the bending area from among a plurality of strain gages which are embedded in the front surface of the flexible apparatus 100. As a result, the plurality of strain gages output a resistance value according to the magnitude of the applied force. Accordingly, the controller 130 determines an area 52 which includes all points at which the strain gages output different resistance values from those in the original state, as one bending area. In addition, when the distance between the points of the strain gages at which the change in the resistance value is detected lies beyond a predetermined distance, the controller 130 delineates different bending areas with reference to such points.

The controller 130 may determine a line that connects points at which the strain gages output the resistance values greatly different from those of the original state in the bending area as a bending line. For example, the controller 130 may determine, as a bending line, a line that connects at least two strain gages to which the greatest force is applied, or at least two strain gages to which the next greatest force is applied according to bending of the flexible apparatus 100.

For example, when the flexible apparatus 100 is bent in the horizontal direction as shown in FIG. 3B, the controller 130 may determine a line that connects the first strain gage 51-$p$+2 and the second strain gage 51-$r$+3 which output resistance values greatly different from those of the original state as a bending line.

In the above-described embodiment, the strain gages 51-1, 51-2, . . . are embedded in the front surface of the flexible apparatus 100. The strain gages 51-1, 51-2, . . . may be embedded in the front surface of the flexible apparatus 100 to detect bending of the flexible apparatus 100 in a Z+ direction.

The bending direction of the flexible apparatus 100 refers to a direction in which the bent flexible apparatus 100 curves. For example, on the assumption that the front surface of the flexible apparatus 100 is a 2-dimensional x-y plane, when the bent flexible apparatus 100 curves in a z− direction of a z-axis which is perpendicular to the x-y plane, the bending direction of the flexible apparatus 100 is a Z+ direction, and, when the bent flexible apparatus 100 curves in a z+ direction of the z-axis, the bending direction of the flexible apparatus is a Z− direction.

Accordingly, the strain gages may be embedded in the rear surface of the flexible apparatus 100 to detect bending of the flexible apparatus 100 in the Z− direction. However, such a configuration is merely an example and the strain gages may be embedded in one surface of the flexible apparatus 100 to detect bending in the Z+ direction and the Z− direction.

The sensor 120 may detect a degree of bending of the flexible apparatus 100, for example, a bending angle. The bending angle refers to an angle which is between an angle when the flexible apparatus 100 is in a flat state and an angle when the flexible apparatus 100 is bent.

Figure 4:
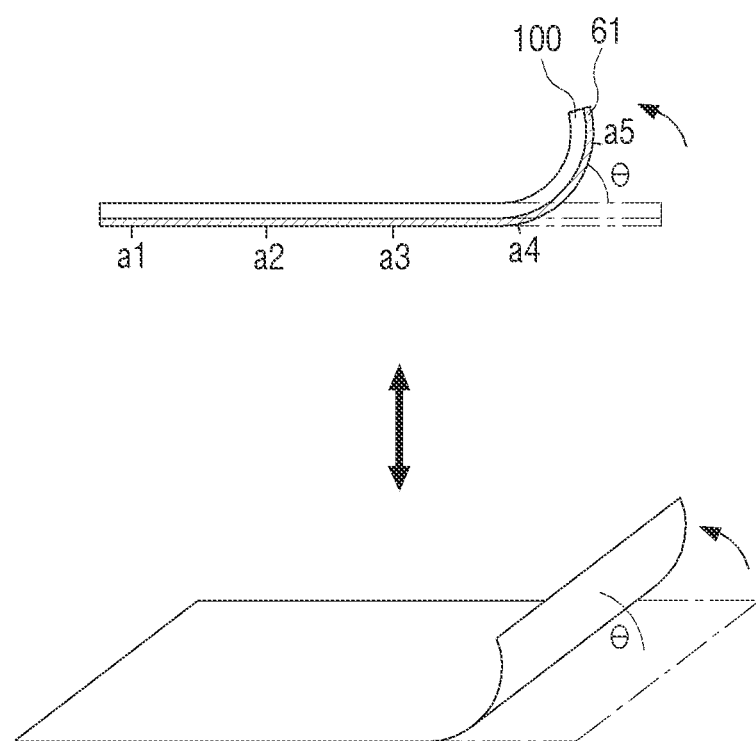

FIG. 4 is a view to illustrate a method for determining a bending angle of the flexible apparatus according to an embodiment of the present disclosure.

Referring to FIG. 4, the controller 130 may determine a bending angle of the flexible apparatus 100 based on a result of detecting by the sensor 120. To achieve this, the flexible apparatus 100 may store resistance values which are output from the bending line according to a bending angle in advance. Accordingly, the controller 130 compares the resistance values which are output from the bend sensors or the strain gages located on the bending line when the flexible apparatus 100 is bent, with the pre-stored resistance values, and determines the bending angle matching the detected resistance values.

For example, when the flexible apparatus 100 is bent as shown in FIG. 4, the bend sensor point a4 that is located on the bending line outputs the greatest resistance value. At this time, the controller 130 may determine a bending angle θ matching the resistance value output from the point a4 using the resistance values which are pre-stored according to bending angles.

As described above, the bending direction of the flexible apparatus 100 may be split into the Z+ direction or the Z− direction. The sensor 120 may detect the bending direction of the flexible apparatus 100 in various ways. A detailed description is provided with reference to FIGS. 5 and 6.

Figure 5A:
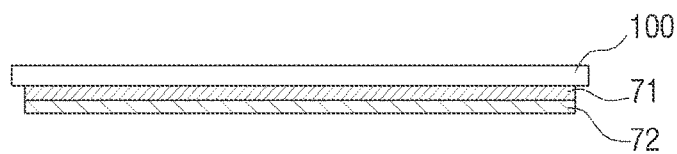
FIGS. 5A, 5B, and 5C are views to illustrate a method for detecting a bending direction using overlapping bending sensors according to an embodiment of the present disclosure.
Figure 5B:
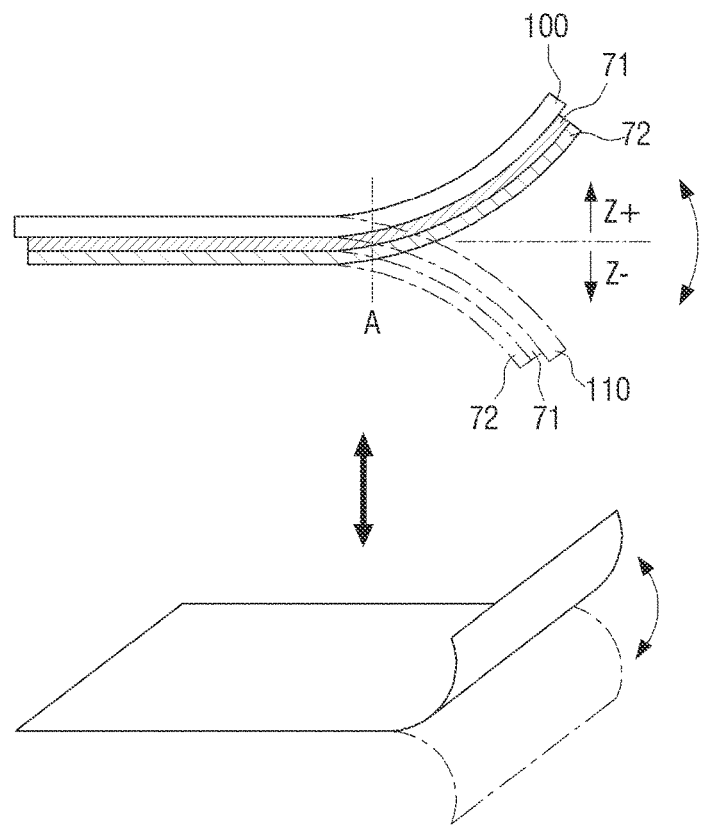
Figure 5C:
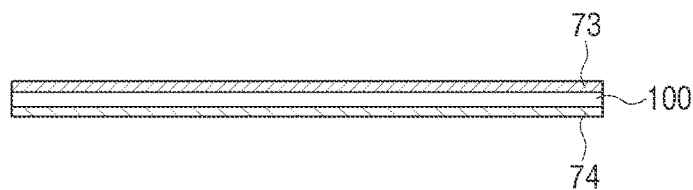

FIGS. 5A, 5B, and 5C are views to illustrate a method for detecting a bending direction using overlapping bend sensors according to an embodiment of the present disclosure.

Referring to FIGS. 5A, 5B, and 5C, the controller 130 may determine a bending direction of the flexible apparatus 100 based on a result of detecting by the sensor 120. To achieve this, the sensor 120 may include a bend sensor.

For example, as shown in FIG. 5A, the sensor 120 may include two bend sensors 71 and 72 which are disposed overlapping each other on one side of the flexible apparatus 100. In this case, when bending is performed in one direction, different resistance values are output from the upper bend sensor 71 and the lower bend sensor 72 at a point at which the bending is performed. Accordingly, a bending direction may be determined by comparing the resistance values of the two bend sensors 71 and 72 at the same point.

Specifically, when the flexible apparatus 100 is bent in the Z+ direction as shown in FIG. 5B, tension exerted to the lower bend sensor 72 is greater than that of the upper bend sensor 71 at a point 'A' corresponding to a bending line. In contrast, when the flexible apparatus 100 is bent in the Z− direction, tension exerted to the upper bend sensor 71 is greater than that of the lower bend sensor 72.

Accordingly, the controller 130 may detect the bending direction by comparing the resistance values of the two bend sensors 71 and 72 at the point A. For example, when the resistance value output from the lower bend sensor from among the two overlapping bend sensors is greater than that of the upper bend sensor at the same point, the controller 130 may determine that the flexible apparatus is bent in the Z+ direction. In addition, when the resistance value output from the upper bend sensor from among the two overlapping bend sensors is greater than that of the lower bend sensor at the same point, the controller 130 may determine that the flexible apparatus is bent in the Z− direction.

Although the two bend sensors are disposed overlapping each other on one side of the flexible apparatus 100 in FIGS. 5A and 5B, the bend sensors may be disposed on opposite surfaces of the flexible apparatus 100 as shown in FIG. 5C.

FIG. 5C illustrates the two bend sensors 73 and 74 which are disposed on the opposite surfaces of the flexible apparatus 100.

Referring to FIG. 5C, when the flexible apparatus 100 is bent in the Z+ direction, the bend sensor which is disposed on a first surface of the opposite surfaces of the flexible apparatus 110 is subject to a compressive force, whereas the bend sensor which is disposed on a second surface is subject to tension. In contrast, when the flexible apparatus 100 is bent in the Z− direction, the bend sensor disposed on the second surface is subject to a compressive force, whereas the bend sensor disposed on the first surface is subject to tension. As described above, the different values are detected from the two bend sensors according to the bending direction and the controller 130 determines the bending direction according to a detection characteristic of the value.

Although the bending direction is detected using the two bend sensors in FIGS. 5A to 5C, the bending direction may be detected by means of only a strain gage disposed on one surface or opposite surfaces of the flexible apparatus 100. For example, when the strain gages embedded in the front surface of the flexible apparatus 100 output different resistance values from those of the original state, the controller 130 may determine that the flexible apparatus 100 is bent in the Z+ direction, and, when the strain gages embedded in the rear surface of the flexible apparatus 100 output different resistance values from those of the original state, the controller 130 may determine that the flexible apparatus 100 is bent in the Z− direction.

Figure 6A:
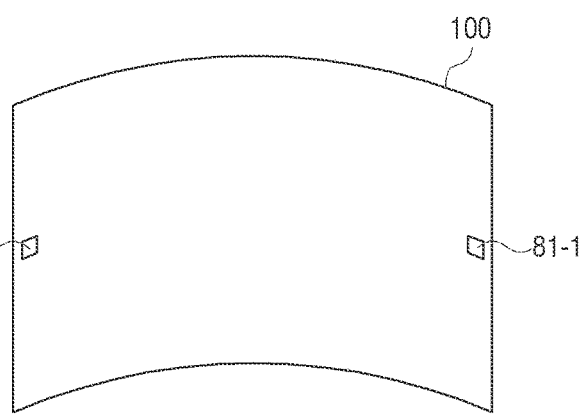
FIGS. 6A and 6B are views to illustrate a method for detecting a bending direction according to an embodiment of the present disclosure.
Figure 6B:
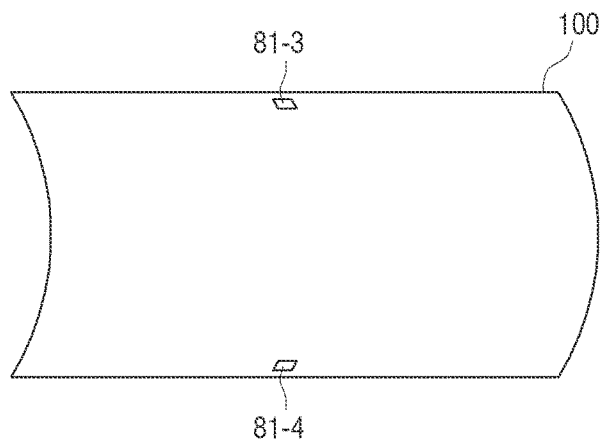

FIGS. 6A and 6B are views to illustrate a method for detecting a bending direction according to another embodiment of the present disclosure.

Referring to FIGS. 6A and 6B, views to illustrate a method for detecting a bending direction using an acceleration sensor are illustrated.

The sensor 110 may include a plurality of acceleration sensors which are disposed on edge areas of the flexible apparatus 100. The controller 130 may determine a bending direction of the flexible apparatus 100 based on a result of detecting by the sensor 120.

The acceleration sensors may measure acceleration of a motion and a direction of the acceleration. Specifically, the acceleration sensors output a detecting value corresponding to acceleration of gravity which changes according to a slope of an apparatus where those sensors are attached.

Accordingly, when the acceleration sensors 81-1 and 81-2 are disposed on opposite edges of the flexible apparatus 100 as shown in FIG. 6A, output values detected by the acceleration sensors are changed when the flexible apparatus 100 is bent. The controller 130 calculates a pitch angle and a roll angle using the output values detected by the acceleration sensors 81-1 and 81-2. Accordingly, the controller 130 may determine a bending direction based on changes in the pitch angle and the roll angle detected by the acceleration sensors 81-1 and 81-2.

In FIG. 6A, the acceleration sensors 81-1 and 81-2 are disposed on opposite edges in the horizontal direction with reference to the front surface of the flexible apparatus 100. However, the acceleration sensors may be disposed in the vertical direction as shown in FIG. 6B. In this case, when the flexible apparatus 100 is bent in the vertical direction, a bending direction is detected according to measurement values detected by the acceleration sensors 81-3 and 81-4 in the vertical direction.

In FIGS. 6A and 6B, the acceleration sensors are disposed on the left and right edges or the upper and lower edges of the flexible apparatus 100. However, the acceleration sensors may be disposed all of the left, right, upper and right edges and/or may be disposed on corners.

The bending direction may be detected using a gyro sensor or a geomagnetic sensor besides the acceleration sensor. The gyro sensor refers to a sensor which, if a rotational motion occurs, detects an angular velocity by measuring Coriolis' force exerted in a velocity direction of the motion. Based on a measurement value of the gyro sensor, a direction of the rotational motion can be detected and thus a bending direction can also be detected. The geomagnetic sensor refers to a sensor which detects azimuth using a 2-axis or 3-axis fluxgate. When such a geomagnetic sensor is applied, the geomagnetic sensor disposed on each edge of the flexible apparatus 100 suffers from location movement when the edge is bent, and outputs an electric signal corresponding to a change in geomagnetism caused by the location movement. The controller 130 may calculate a yaw angle using the value output from the geomagnetic sensor. According to a change in the calculated yaw angle, various bending characteristics such as a bending area and a bending direction can be determined.

As described above, the controller 130 may determine bending of the flexible apparatus 100 based on a result of detecting by the sensor 110. The above-described configurations of the sensors and detecting methods may be applied to the flexible apparatus 100 individually, and may be applied in combination.

The bending holder 120 holds a bending state of the flexible apparatus 100. To achieve this, the bending holder 120 may include a plurality of polymer films which are disposed on a predetermined area of the flexible apparatus 100. In order to fix the overall area of the flexible apparatus 100 in the bending state, the plurality of polymer films may be disposed on the overall area of the flexible apparatus 100, and, in order to fix some areas of the flexible apparatus 100 in the bending state, the plurality of polymer films may be disposed on some areas of the flexible apparatus 100.

The controller 130 controls an overall operation of the flexible apparatus 100. In particular, the controller 130 may determine bending of the flexible apparatus 100 based on a result of detecting by the sensor 110. Specifically, the controller 130 may determine bending/unbending of the flexible apparatus 100, a location of a bending area, a location of the bending area, a size of the bending area, a number of bending areas, a size of a bending line, a location of the bending line, a number of bending lines, a bending direction, a bending angle, and a number of times that bending occurs, using the resistance values output from the bend sensors or the strain gages. This has been described above with reference to FIGS. 2 to 6 and a redundant explanation is omitted.

When a predetermined input is received while the flexible apparatus 100 is bent, the controller 130 may control the bending holder 120 to hold the bending state of the flexible apparatus 100.

Specifically, when the flexible apparatus 100 is bent, the controller 130 stores information on the bending state in the flexible apparatus 100, and, when a predetermined input is received, the controller 130 controls to hold the bending state of the flexible apparatus 100 using the pre-stored information. The information on the bending state may include at least one of a bending area, a bending angle, and a bending direction of the flexible apparatus 100.

Figure 7A:
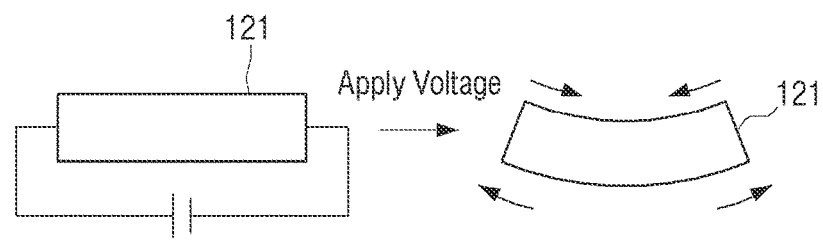
FIGS. 7A and 7B are views to illustrate a method for holding a bending state of a flexible apparatus according to an embodiment of the present disclosure.
Figure 7B:
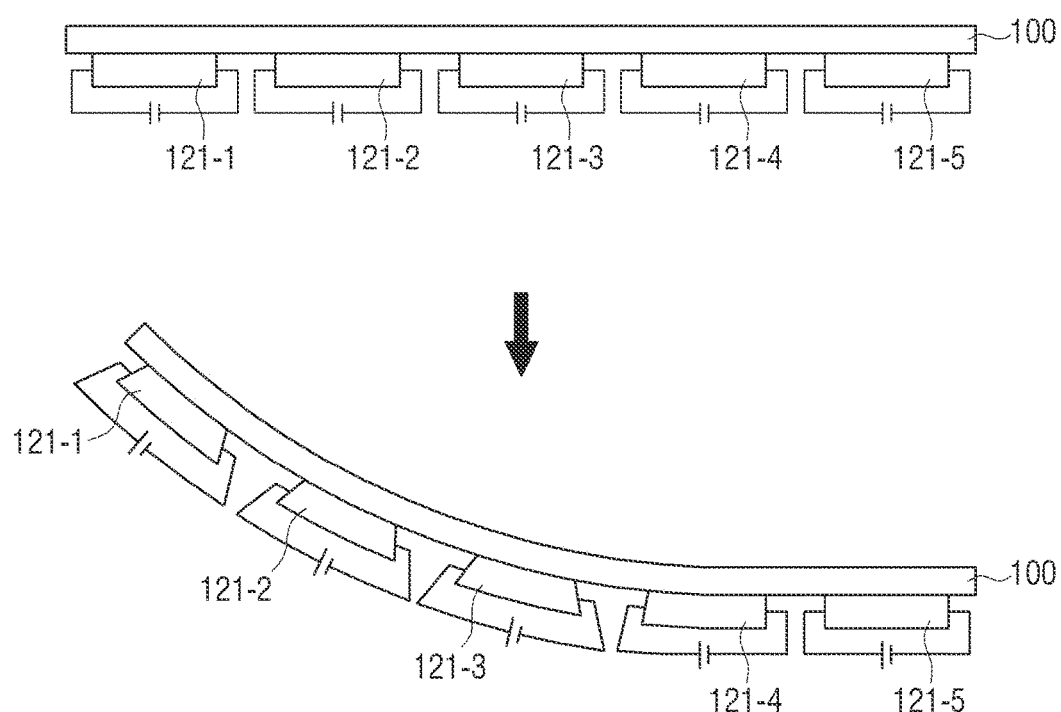

FIGS. 7A and 7B are views to illustrate a method for holding a bending state of the flexible apparatus according to an embodiment of the present disclosure.

Referring to FIGS. 7A and 7B, and as described above, the bending holder 120 may include a plurality of polymer films. The polymer film is made of silicone or urethane dielectric elastomer, and the shape of the polymer film may be deformed according to a potential difference of voltages applied to electrodes which are coated over one side and the other side.

For example, when a voltage of a predetermined level is applied to a polymer film 121 as shown in FIG. 7A, an upper portion of the polymer film 121 is contracted and a lower portion is stretched. Accordingly, the controller 130 applies a voltage to the polymer film 121 and deforms the shape of the polymer film 21, so that the flexible apparatus 100 is held in the bending state.

In order to hold the flexible apparatus 100 in a constant state, the flexible apparatus 100 may pre-store information relating to which of the polymer films disposed in the flexible apparatus 100 a voltage is applied, an amount of voltage that should be applied to the polymer film, an order in which the voltage is applied to the polymer films, and/or the like (hereinafter, collectively referred to as control information). Accordingly, the controller 130 may apply a voltage to the polymer film to hold the bending state of the flexible apparatus 100 using the pre-stored control information.

Specifically, when the flexible apparatus 100 is bent, the controller 130 determines a location of a bending area, a bending angle, and a bending direction based on values detected by the sensor 110, and stores information on the determined bending state in the flexible apparatus 100.

Thereafter, when a user manipulation to hold the bending state of the flexible apparatus 100 is input, the controller 130 determines the bending state of the flexible apparatus 100 using the information on the bending state. The bending state may include at least one of the bending area, the bending angle, and the bending direction of the flexible apparatus 100.

The controller 130 determines a location of a polymer film to which a voltage is to be applied to hold the bending state of the flexible apparatus 100, a level of a voltage to be applied, and a voltage applying order, using the pre-stored control information, and applies a corresponding voltage to the polymer film and controls to hold the bending state of the flexible apparatus 100.

As an example for illustrative purposes, the left of the flexible apparatus 100 may be assumed to be bent by approximately 45° in the Z+ direction as shown in FIG. 7B. In this case, by applying a voltage of a predetermined level to the polymer films 121-1 to 121-3 which are located in the bending area, the controller 130 may control to hold the state in which the left of the flexible apparatus 100 is bent by 45° in the Z+ direction. In contrast, because the polymer films 121-4 and 121-5 are outside the bending area, a voltage may not be applied thereto.

In the above-described embodiment of the present disclosure, the five polymer films are provided. However, such a configuration is merely an example for convenience of explanation, and according to various embodiments of the present disclosure, the number and size of the polymer films may be changed according to a size of the flexible apparatus 100.

Also, in the above-described embodiment, the bending holder 120 includes the polymer films. However, in addition, or alternatively, the bending holder 120 may include a string, a piezoelectric element (e.g., a series bimorph piezoelectric element or parallel bimorph piezoelectric element), an Electro Active Polymer (EAP), an Electro Mechanical Polymer (EMP), and/or the like, and may hold the bending state of the flexible apparatus 100.

For example, when the bending holder 120 includes the string, the controller 130 may hold the bending state of the flexible apparatus 100 by changing a tensile force of the string. For example, when the shape of the flexible apparatus 100 is deformed by an external force, the flexible apparatus 100 is subject to a force of a reverse direction to return to the flat state due to the elasticity of the flexible apparatus 100. In this case, the controller 130 provides a physical force corresponding to the force of the reverse direction to the flexible apparatus 100, thereby holding the bending state of the flexible apparatus 100.

The user manipulation to hold the bending state of the flexible apparatus 100 may be input in various ways.

For example, when the flexible apparatus 100 is bent in the opposite direction to the bending direction of the flexible apparatus 100 within a predetermined time in the state in which the flexible apparatus 100 is bent, the controller 130 may control to hold the bending state of the flexible apparatus 100 using the pre-stored information.

For example, when the flexible apparatus 100 is bent in the Z+ direction and then is bent in the Z− direction within a predetermined time in the state in which the flexible apparatus 100 is bent, or when the flexible apparatus 100 is bent in the Z-direction and then is bent in the Z+ direction within a predetermined time in the state in which the flexible apparatus 100 is bent, the controller 130 may control to hold the bending state of the flexible apparatus 100.

To achieve this, when the flexible apparatus 100 is bent and then is re-bent within a predetermined time, the controller 130 may determine the bending direction of the re-bent flexible apparatus 100. When the bending direction of the flexible apparatus 100 is opposite to the bending direction of the re-bent flexible apparatus 100, the controller 130 may control the bending holder 120 to hold the bending state of the flexible apparatus 100.

FIGS. 8, 9, 10, and 11 are views to illustrate an example of a user manipulation to hold a bending state of the flexible apparatus according to an embodiment of the present disclosure.

Referring to FIGS. 8, 9, 10, and 11, when a first bending manipulation is performed in a first direction in which a center area of the flexible apparatus 100 curves upwardly or downwardly, and a second bending manipulation is performed on edge areas of the flexible apparatus 100 in a second direction which is opposite to the first direction, the controller 130 may control to hold the bending state of the flexible apparatus 100.

The center area is an area of a predetermined size that includes a center of the flexible apparatus 100. The edge area may be an area that excludes the center area of the flexible apparatus 100.

Figure 8:
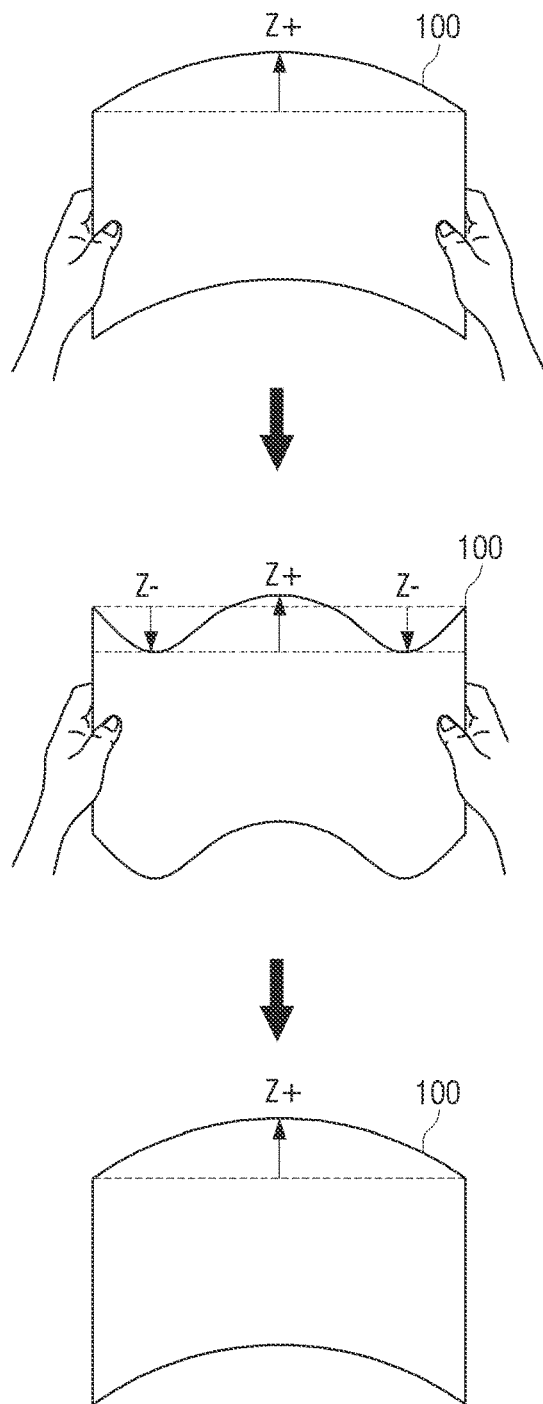
FIGS. 8, 9, 10 and 11 are views to illustrate an example of a user manipulation to hold a bending state of a flexible apparatus according to an embodiment of the present disclosure.

For example, as illustrated in FIG. 8, when the center area of the flexible apparatus 100 is bent in the Z+ direction and the left edge area and the right edge area of the flexible apparatus 100 are bent in the Z− direction, the controller 130 may control to hold the bending state in which the center area of the flexible apparatus 100 is bent in the Z+ direction.

Figure 9:
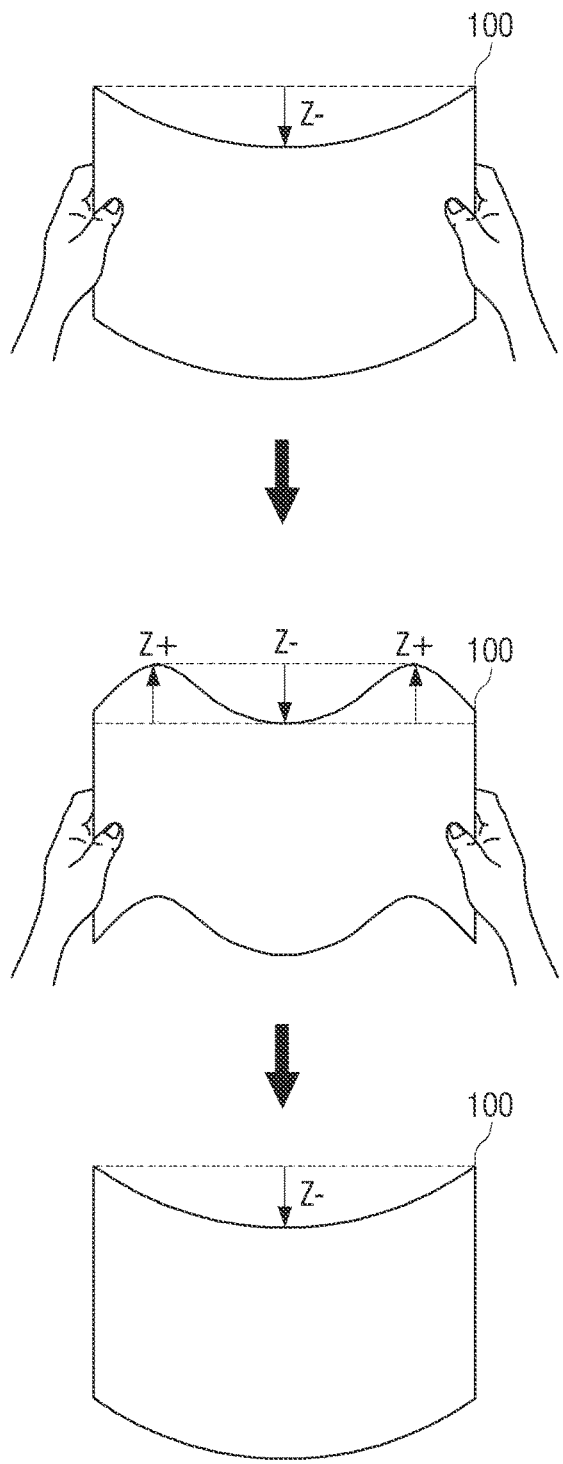

In addition, as illustrated in FIG. 9, when the center area of the flexible apparatus 100 is bent in the Z− direction and the left edge area and the right edge area of the flexible apparatus 100 are bent in the Z+ direction, the controller 130 may control to hold the bending state in which the center area of the flexible apparatus 100 is bent in the Z− direction.

In contrast, when a first bending manipulation is performed in a first direction in which one area of the flexible apparatus 100 curves upwardly or downwardly, and a second bending manipulation is performed on the other area in a second direction which is opposite to the first direction, the controller 130 may hold the bending state of the flexible apparatus 100.

The other area may be included in the bent area that is formed by bending one area of the flexible apparatus 100.

Figure 10:
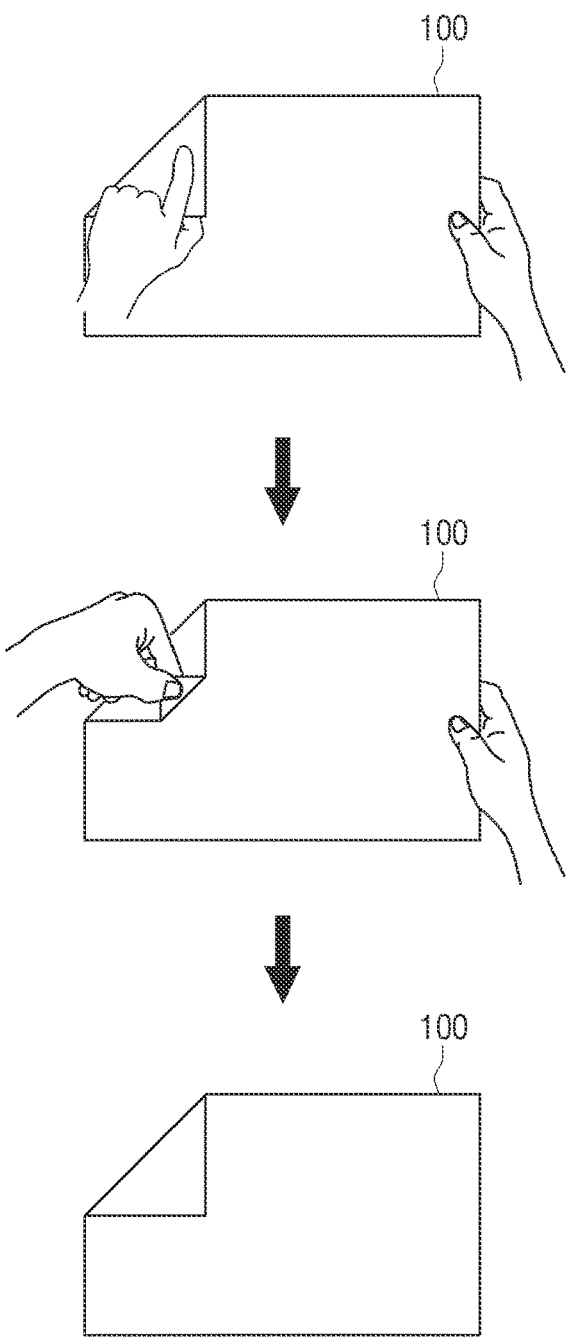

For example, as illustrated in FIG. 10, when a left upper area of the flexible apparatus 100 is bent in the Z+ direction and one area of the bent left upper area is bent in the Z− direction, the controller 130 may control to hold the bending state in which the left upper area of the flexible apparatus 100 is bent in the Z+ direction.

Figure 11:
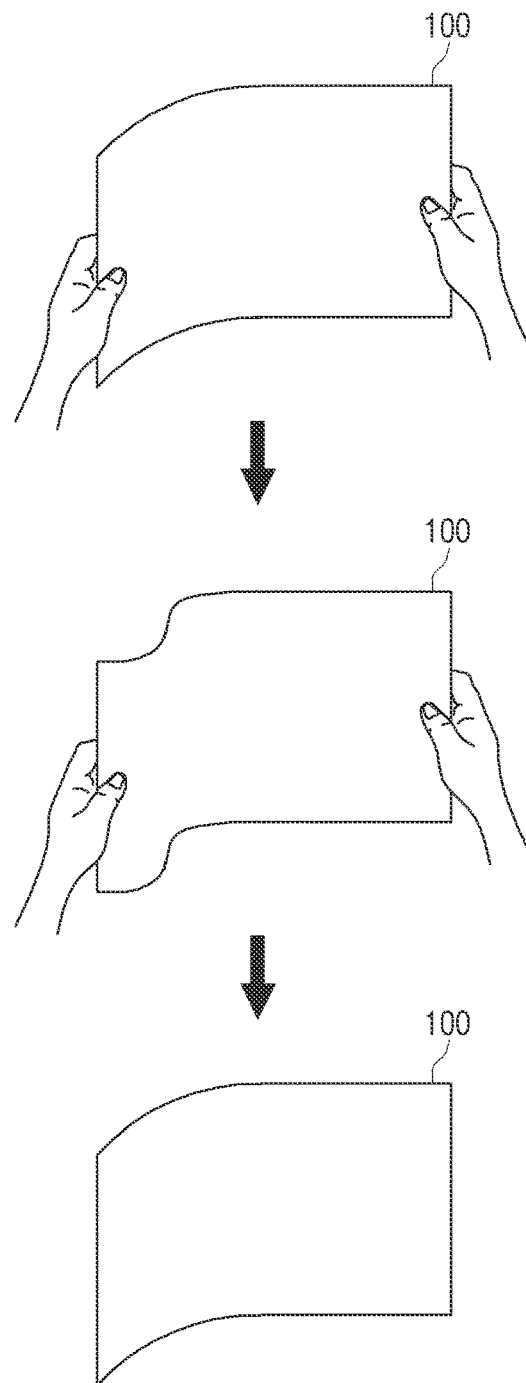

Further, as illustrated in FIG. 11, when the left area of the flexible apparatus 100 is bent in the Z+ direction and one area of the bent left area is bent in the Z− direction, the controller 130 may control to hold the bending state in which the left area of the flexible apparatus 100 is bent in the Z+ direction.

In the above-described embodiment of the present disclosure, when the flexible apparatus 100 is bent in one direction and then is bent in the other direction, the controller 130 may control to hold the bending state. However, such an operation is merely an example.

For example, according to various embodiments of the present disclosure, when a button manipulation to select a button provided on the flexible apparatus 100 is input or when the bending state is held for more than a predetermined time, the controller 130 may control to hold the bending state of the flexible apparatus 100.

As another example, according to various embodiments of the present disclosure, when a first bending manipulation is performed on the flexible apparatus 100 and then a second bending manipulation is performed in the opposite direction to that of the first bending manipulation after a predetermined time elapses, the controller 130 may control to hold the bending state of the flexible apparatus 100.

As another example, according to various embodiments of the present disclosure, when a touch manipulation to touch a display surface provided on the flexible apparatus 100 is input, the controller 130 may control to hold the bending state of the flexible apparatus 100. In this case, the flexible apparatus 100 may include a bendable display (not shown), and the sensor 110 may include a resistive or capacitive touch sensor to detect the touch manipulation on the display (not shown). Accordingly, the controller 130 may determine whether a user manipulation to hold the bending state of the flexible apparatus 100 is input or not based on an electric signal which is transmitted from the sensor 110.

As another example, according to various embodiments of the present disclosure, when a bending manipulation to bend a predetermined area of the flexible apparatus 100 is input, the controller 130 may control to hold the bending state of the flexible apparatus 100. For example, even when a bending manipulation is not performed in the opposite direction to the bending direction of the bent flexible apparatus 100, the controller 130 may control to hold the bending state of the flexible apparatus 100 when bending of a predetermined area of the flexible apparatus 100 is detected. The predetermined area may be set and changed by the user.

As example for illustrative purposes, the left upper area of the flexible apparatus 100 is assumed to be bent in the Z+ direction. In this case, when the right upper area of the flexible apparatus 100 is bent in the Z+ direction while bending is held, the controller 130 may control to hold the bending state in which the left upper area of the flexible apparatus 100 is bent in the Z+ direction.

According to various embodiments of the present disclosure, the controller 130 may control to hold the bending state of the flexible apparatus 100 based on a user's voice or motion.

Specifically, the controller 130 determines whether a voice collected by a voice collecting means provided on the flexible apparatus 100 such as a microphone (not shown) or the like is consistent with a predetermined voice command. When the collected voice is determined to be consistent with a voice command to hold the bending state of the flexible apparatus 100, the controller 130 controls to hold the bending state of the flexible apparatus 100.

The controller 130 analyzes an image of the user which is obtained through an image photographing means (not shown) provided on the flexible apparatus 100 such as a camera, and the controller 130 determines a user's motion gesture. Specifically, the controller 130 analyzes the image of the user. When the controller 130 determines that the user makes a motion gesture corresponding to a motion command to hold the bending state of the flexible apparatus 100, the controller 130 controls to hold the bending state of the flexible apparatus 100.

In contrast, when a predetermined input is not received while the flexible apparatus 100 is bent, the controller 130 may reset the information on the bending state that is stored in the flexible apparatus 100. The predetermined input may include a user manipulation to hold the bending state of the bent flexible apparatus 100, and for example, may include re-bending the flexible apparatus 100 in the opposite direction to that of the prior bending while the flexible apparatus 10 is bent.

According to various embodiments of the present disclosure, when a user manipulation other than the predetermined input, such as changing a bending angle of the flexible apparatus 100, returning the flexible apparatus 100 to the flat state, and re-bending the flexible apparatus 100 after the flexible apparatus 100 returns to the flat state, is input, the controller 130 may reset the information on the bending state that is stored in the flexible apparatus 100.

When the flexible apparatus 100 is bent by a first bending manipulation and a second bending manipulation is performed in the opposite direction to that of the first bending manipulation, but the second bending manipulation is performed after a predetermined time elapses after the first bending manipulation, the controller 130 may reset the information on the bending state that is stored in the flexible apparatus 100.

As described above, the controller 130 may store the information on the final bending state of the flexible apparatus 100 in the flexible apparatus 100. When the predetermined input is received while the flexible apparatus 100 is finally bent, the controller 130 may control to hold the final bending state of the flexible apparatus 100 using the information on the final bending state.

As an example, the flexible apparatus 100 may be assumed to be bent by a first bending manipulation and thereafter a second bending manipulation may be performed in the same direction as that of the first bending manipulation. In this case, the controller 130 resets information on the bending state that is stored when the first bending manipulation of the flexible apparatus 100 is performed, and stores information on the bending state of the flexible apparatus 100 when the second bending manipulation is performed. Thereafter, when a third manipulation is performed in the opposite direction to that of the second bending manipulation while the flexible apparatus 100 is bent by the second bending manipulation, the controller 130 may control to hold the state in which the flexible apparatus 100 is bent by the second bending manipulation.

However, the flexible apparatus 100 may have a property to return to the flat state due to the elasticity of the flexible apparatus 100. Therefore, when no external force is applied after the flexible apparatus 100 is bent by the first bending manipulation and thus the flexible apparatus 100 returns to the flat state, the controller 130 may perform only the operation of resetting the information on the bending state that is stored in the flexible apparatus 100. For example, the information on the bending state may not be separately stored.

In contrast, as described above, when the flexible apparatus 100 is bent by the first bending manipulation and then the second bending manipulation is performed in the opposite direction to that of the first bending manipulation, the controller 130 may control the bending holder 120 to hold the state in which the flexible apparatus 100 is bent by the first bending manipulation.

In this case, when a predetermined time elapses after the second bending manipulation has been performed, the controller 130 may control the bending holder 120 to hold the first bending state. The controller 130 may control the bending holder 120 to hold the first bending state in order to determine whether an intention of the user who performs the second bending manipulation is to hold the first bending state. Accordingly, when the second bending manipulation is canceled before the predetermined time elapses after the second bending manipulation has been performed, the controller 130 may determine that the second bending manipulation is not a bending manipulation to hold the first bending state, and may reset the information on the bending state that is stored when the first bending manipulation is performed. At this time, because the flexible apparatus 100 has a property to return to the flat state due to the elasticity of the flexible apparatus 100, the flexible apparatus 100 may return to the flat state when no external force is applied.

In the above-described embodiment of the present disclosure, the second bending manipulation is canceled before the predetermined time elapses after the second bending manipulation has been performed. However, this is merely an example. When a new bending manipulation is performed before the predetermined time elapses after the second bending manipulation has been performed, the controller 130 may reset the information on the bending state that is stored when the first bending manipulation is performed. In this case, the controller 130 may control to store the information on the final bending state of the flexible apparatus 100 according to the second bending manipulation.

When the flexible apparatus 100 is bent by the first bending manipulation and then the second bending manipulation is performed in the opposite direction to that of the first bending manipulation, but, when an area bent by the second bending manipulation is brought into contact with an area bent by the first bending manipulation, the controller 130 may reset the information on the bending state that is stored when the first bending manipulation is performed.

As an example, the left upper area of the flexible apparatus 100 may be assumed to be bent by about 90° in the Z+ direction, and then one area of the bent left upper area is bent in the Z− direction. At this time, when the one area of the left upper area is bent by about 180° in the Z− direction and thus the front surface and the rear surface of the flexible apparatus 100 are brought into contact with each other, the controller 130 may reset the information on the bending state that is stored when the first bending manipulation is performed.

The sensor 120 may include a touch sensor, a pressure sensor, and a proximity sensor to detect whether the front surface and the rear surface of the flexible apparatus 100 are brought into contact with each other, and the controller 130 may determine whether the front surface and the rear surface of the flexible apparatus 100 are brought into contact with each other based on the output values of these sensors.

The controller 130 may determine whether the front surface and the rear surface of the flexible apparatus 100 are brought into contact with each other using resistance values which are output from the bend sensors or strain gages. For example, the flexible apparatus 100 may pre-store the resistance values that are output from the bending line when the flexible apparatus 100 is bent by 180°, and, when the flexible apparatus 100 is bent and resistance values corresponding to the pre-stored resistance values are output from the bending line, the controller 130 may determine that the flexible apparatus 100 is bent by 180° and thus the front surface and the rear surface of the flexible apparatus 100 are brought into contact with each other.

In contrast, when an unfixing command is input while the flexible apparatus 100 is bent, the controller 130 may control the bending holder 120 to return the flexible apparatus 10 to the flat state. Specifically, when the unfixing command is input, the controller 130 may block the voltage applied to the polymer film and return the flexible apparatus 100 to the flat state. When the unfixing command is input, the controller 130 may reset the information on the bending state that is stored in the flexible apparatus 100.

The unfixing command may be input by at least one of a button manipulation to select a button provided on a body of the flexible apparatus 100 and a bending manipulation to bend a predetermined area of the flexible apparatus 100. The predetermined area may be set and changed by the user, and may be changed according to a location of an initially bent area.

For example, when the left area or the right area is initially bent with a reference to the center of the flexible apparatus 100, and the right area or the left area of the flexible apparatus 100 is bent, the controller 130 may determine that the unfixing command is input. In addition, when the upper area or the lower area of the flexible apparatus 100 is initially bent with reference to the center of the flexible apparatus 100, and the lower area or the upper area of the flexible apparatus 100 is bent, the controller 130 may determine that the unfixing command is input.

However, such a configuration is merely an example and a location of an area to be bent to input the unfixing command may be variously implemented.

As an example, according to various embodiments of the present disclosure, the controller 130 may return the fixed flexible apparatus 100 to the original flat state based on a user' voice or motion. For example, when a voice or a user's motion gesture which is collected is consistent with a command to release the bending state of the flexible apparatus 100, the controller 130 may return the flexible apparatus 100 to the flat state.

In addition, when an application installed in the flexible apparatus 100 is executed, the controller 130 may return the flexible apparatus 100 to the original flat state. The application recited herein refers to software that may be directly used by the user on an Operation System (OS), and may be provided in the form of an icon interface on a screen of a display (not shown) when the flexible apparatus 100 includes a bendable display (not shown). For example, the application may include an e-book application, a game application, a message application, and/or the like.

For example, when the user touches the display (not shown) and executes the application while the flexible apparatus 100 is bent and fixed, the controller 130 may return the fixed flexible apparatus 100 to the original flat state.

Figure 12:
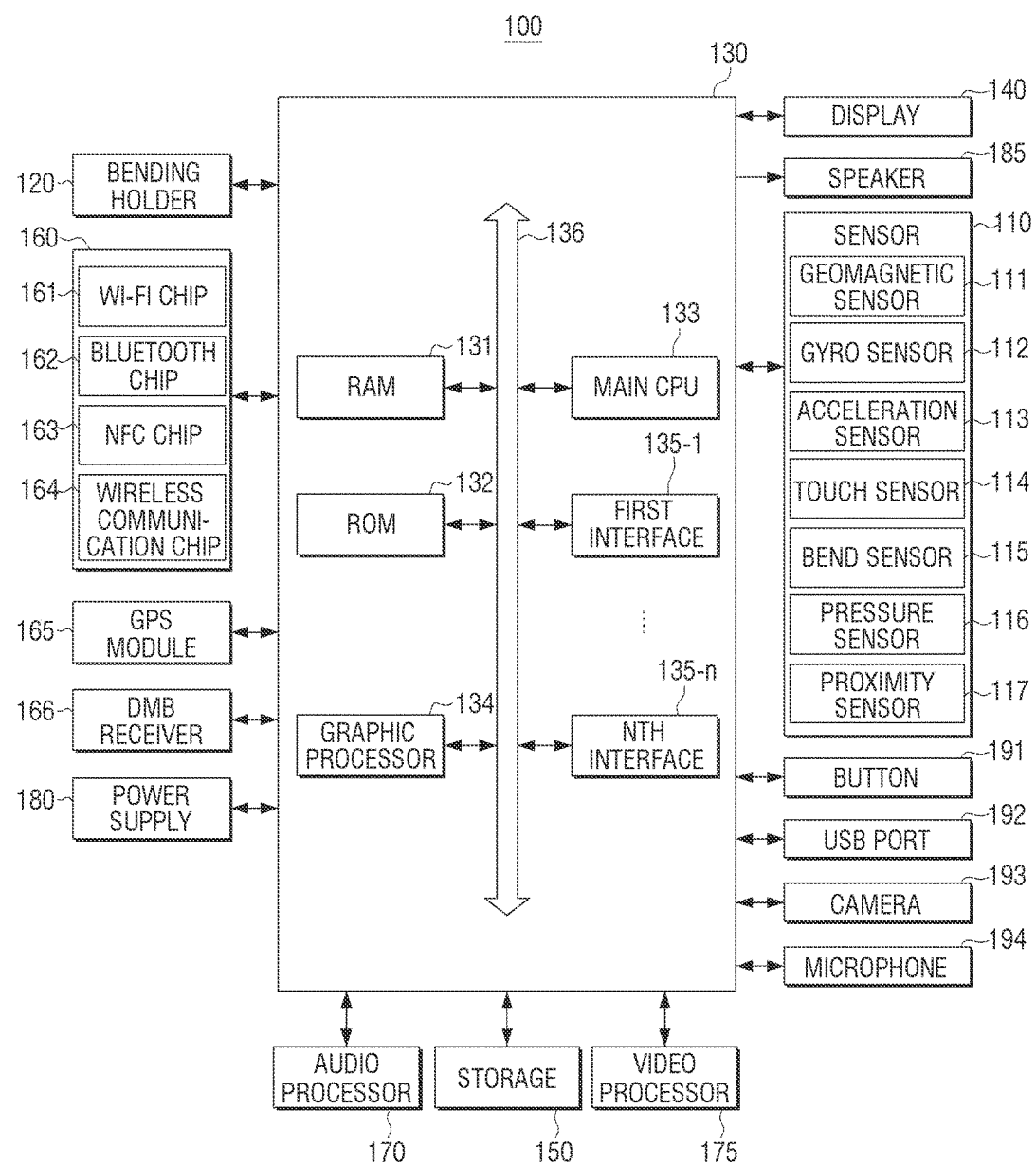
FIG. 12 is a block diagram to illustrate a detailed configuration of a flexible apparatus according to an embodiment of the present disclosure.

FIG. 12 is a block diagram to illustrate a detailed configuration of a flexible apparatus according to an embodiment of the present disclosure.

Referring to FIG. 12, the flexible apparatus 100 may include a sensor 110, a bending holder 120, a controller 130, a display 140, a storage 150, a communicator 160, a GPS module 165, a Digital Multimedia Broadcasting (DMB) receiver 166, an audio processor 170, a video processor 175, a power supply 180, a speaker 185, a button 191, a USB port 192, a camera 193, and a microphone 194.

The display 140 displays various screens. Specifically, the display 140 may display a content playback screen such as an image, a moving image, a text, music, an execution screen, various User Interface (UI) screens, or the like.

The display 140 may be bent. For example, the display 140 may be provided on one surface or opposite surfaces of the flexible apparatus 100 and may be bent along with the flexible apparatus 100. Accordingly, the display 140 may have a bendable structure and may be made of bendable material. Hereinafter, a detailed configuration of the display 140 will be explained with reference to FIG. 13.

Figure 13:
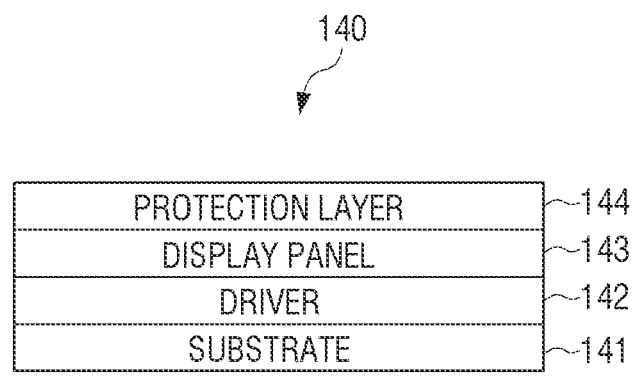
FIG. 13 is a view to illustrate a configuration of a display which constitutes a flexible apparatus according to an embodiment of the present disclosure.

FIG. 13 illustrates a configuration of a display that constitutes a flexible apparatus according to an embodiment of the present disclosure.

Referring to FIG. 13, the display 140 includes a substrate 141, a driver 142, a display panel 143, and a protection layer 144.

The flexible apparatus 100 refers to an apparatus which can be bent, crooked, folded, rolled like paper, or the like, while having display characteristics of an existing flat panel display apparatus. For example, the flexible apparatus 100 may have display characteristics of a flat panel display while the flexible apparatus 100 is being manipulated or is otherwise positioned in a manipulated state. According to various embodiments of the present disclosure, the flexible apparatus 100 is manufactured on a flexible substrate.

Specifically, the substrate 141 may be implemented by a plastic substrate (e.g., a high molecular film) which is deformable by an external pressure.

According to various embodiments of the present disclosure, the plastic substrate has a structure which is formed by performing barrier coating opposite surfaces of a base film. The base film may be implemented by using various resins such as Polyimide (PI), Polycarbonate (PC), Polyethyleneterephtalate (PET), Polyethersulfone (PES), Polythylenenaphthalate (PEN), Fiber Reinforced Plastic (FRP), and/or the like. The barrier coating is performed on the opposite surfaces of the base film, and an organic membrane or an inorganic membrane may be used for the purpose of maintaining flexibility.

The substrate 141 may be formed of a flexible material such as thin glass or metal foil besides the plastic substrate.

The driver 142 drives the display panel 143. Specifically, the driver 142 applies driving voltage to a plurality of pixels constituting the display panel 143 and may be implemented by using a-si, a Thin-Film-Transistor (TFT), a Low Temperature Poly Silicon (LTPS) TFT, an Organic TFT (OTFT), and/or the like.

The driver 142 may also be implemented in various forms according to the form of the display panel 143. For instance, the display panel 143 may include an organic light emitting substance which consists of a plurality of pixel cells and an electrode layer which covers opposite surfaces of the organic light emitting substance. In this case, the driver 142 may include a plurality of transistors corresponding to the plurality of pixel cells of the display panel 143. The controller 130 applies an electric signal to a gate of each transistor and controls the pixel cell connected to the transistor to emit light. Accordingly, various screens are displayed.

The display panel 143 may be implemented by using an Electroluminescent Display (ELD), an Electrophoretic Display (EPD), an Electrochromic Display (ECD), a Liquid Crystal Display (LCD), an Active Matrix LCD (AMLCD), a Plasma Display Panel (PDP), the Organic Light Emitting Diode (OLED), and/or the like. However, various display panels (e.g., the LCD) may not be able to emit light by itself and thus requires a separate backlight unit. When the LCD does not use the backlight unit, the LCD uses ambient light. In order to use the LCD display panel 143 without the backlight unit, an environment such as an outdoor environment which provides sufficient light may be used to operate the LCD.

The protection layer 144 protects the display panel 143. For example, the protection layer 144 may be made of ZrO, CeO2, ThO2, and/or the like. The protection layer 144 may be manufactured as a transparent film and may cover the entire surface of the display panel 143.

According to various embodiments of the present disclosure, in contrast to the display unit illustrated in FIG. 13, the display unit 140 may be implemented by using electronic paper (e-paper). The e-paper is a display which applies general ink characteristics to paper and is different from a general flat panel display in that the e-paper uses reflective light. The electronic paper may change a picture or text using electrophoresis, which uses a twist ball or a capsule.

When the display 140 is comprised of elements of a transparent material, the display 140 may be implemented as a flexible apparatus 100 which is bendable and has transparency. For example, when the substrate 141 may be made of a polymer material such as a plastic having transparency, the driver 142 may be implemented by a transparent transistor, and the display panel 143 may be implemented by using a transparent organic light emitting substance and a transparent electrode, the display 140 has transparency.

As an example, a transparent transistor refers to a transistor which is manufactured by substituting opaque silicon of a thin film transistor according to the related art with a transparent material such as transparent zinc-oxide, titanium oxide, or the like. The transparent electrode may be made of advanced materials such as Indium Tin Oxide (ITO), graphene, or the like. Graphene is a material which has a planar structure of a honeycomb shape in which carbon atoms are connected to one another, and which has transparency. The transparent organic light emitting layer may be implemented by using various materials.

The sensor 110 includes a geomagnetic sensor 111, a gyro sensor 112, an acceleration sensor 113, a touch sensor 114, a bend sensor 115, a pressure sensor 116, and a proximity sensor 117. The sensor 110 may detect various manipulations such as touch, rotation, tilt, pressure, approach, and/or the like on the flexible apparatus 100 in addition to a bending gesture.

The geomagnetic sensor 111 detects a rotation state and a moving direction of the flexible apparatus 100. The gyro sensor 112 detects a rotation angle of the flexible apparatus 100. Both the geomagnetic sensor 111 and the gyro sensor 112 may be provided, but, when only one of them is provided, the controller 130 may detect the rotation state of the flexible apparatus. The controller 130 may rotate the screen according to the rotation state of the flexible apparatus 100 and may display the screen on the display 140.

The acceleration sensor 113 detects a degree of tilt of the flexible apparatus 100. The acceleration sensor 113 may be used to detect bending characteristics such as a bending direction and a bending area of the flexible apparatus 100.

The touch sensor 114 may be implemented by using a capacitive type, a resistive type of sensor, and/or the like. The capacitive type calculates touch coordinates by detecting minute electricity excited in a user's body when a part of the user's body touches the surface of the display 140, using a dielectric substance coated on the surface of the display 140. The resistive type includes two electrode plates, and, when a user touches a screen, calculates touch coordinates by detecting an electric current flowing due to contact between upper and lower plates at the touched point. As described above, the touch sensor 114 may be embodied in various forms. The controller 130 may determine a location of a touch, a number of touch points, and a touch holding time according to a result of detecting by the touch sensor 114.

The bend sensor 115 may be embodied in various shapes and numbers as described above, and may detect a bending state of the flexible apparatus 100. The configuration and operation of the bend sensor 115 has been described above and thus a redundant explanation is omitted.

The pressure sensor 116 detects a magnitude of pressure exerted to the flexible apparatus 100 when the user performs a touch or bending manipulation, and provides the magnitude of pressure to the controller 130. The pressure sensor 116 may include a piezo film which is embedded in the display 140 and outputs an electric signal corresponding to the magnitude of pressure. Although the pressure sensor 116 is a separate element from the touch sensor 114 in FIG. 12, when the touch sensor 114 is implemented by using a resistive touch sensor, the resistive touch sensor may also perform the function of the pressure sensor 116.

The proximity sensor 117 detects a motion which approaches without directly contacting the display surface of the flexible apparatus 100. The proximity sensor 117 may be implemented by using various types of sensors such as a high-frequency oscillation type proximity sensor which forms a high frequency magnetic field and which detects an electric current induced by a magnetic characteristic which is changed when an object approaches, a magnetic type proximity sensor which uses a magnet, and a capacitive type proximity sensor which detects capacitance that changes when an object approaches, and/or the like.

The controller 130 analyzes various detecting signals detected by the sensor 110, determines a user's intention, and performs an operation corresponding to the intention. For example, the controller 130 may control to hold the bending state of the flexible apparatus 100 based on a result of detecting by the sensor 110.

In addition, the controller 130 may perform various control operations according to various input methods such as touch manipulation, motion input, voice input, button input, and/or the like. The touch manipulation may include simple touch, tap, touch and hold, move, flick, drag and drop, pinch in, pinch out, and/or the like.

For example, the controller 130 may execute an application stored in the storage 150, may configure an execution screen of the application, and may display the execution screen on the display 140. In addition, the controller 130 may reproduce various content stored in the storage 150. The content recited herein may refer to various multimedia content such as images, texts, music, moving images, and/or the like. The controller 130 may communicate with external apparatuses through the communicator 160.

The communicator 160 may communicate with various types of external apparatuses according to various communication methods. The communicator 160 may include a Wi-Fi unit 161, a Bluetooth unit 162, a Near Field Communication (NFC) unit 163, a wireless communication unit 164, and/or the like. The communicator 160 may receive content from various types of external apparatuses and may transmit content to various types of external apparatuses through the above identified units. According to various embodiments of the present disclosure, one or more of the above-identified communication units may be integrated into a single unit.

The Wi-Fi unit 161, the Bluetooth unit 162, and the NFC unit 163 respectively communicate with external apparatuses in a Wi-Fi method, a Bluetooth method, and an NFC method. Among the above-identified units, the NFC unit 163 is operated in the NFC method, which uses 13.56 MHz from among various RF-ID frequency bands such as 135 kHz, 13.56 MHz, 433 MHz, 860~960 MHz, and 2.45 GHz. When the Wi-Fi unit 161 or the Bluetooth unit 162 is used, a variety of connection information such as a Service Set Identification (SSID) and a session key is exchanged first and connection is established using the connection information, and then, a variety of information is exchanged. The wireless communication chip 164 communicates with external apparatuses according various communication standards such as IEEE, Zigbee, $3^{rd}$ Generation (3G), $3^{rd}$ Generation Partnership Project (3GPP), Long Term Evolution (LTE), and/or the like. In particular, the wireless communication unit 164 may access a web server through a mobile communication network and may communicate with the web server.

The GPS module 165 is a module that receives a GPS signal from a GPS satellite and that detects a current location of the flexible apparatus 100. Specifically, the GPS module 165 may receive the GPS signal from the satellite and may generate location information including latitude, longitude, altitude of the current location of the flexible apparatus 100. Specifically, the GPS module 165 receives signals from a plurality of GPS satellites and calculates a distance between the satellite and a receiver using a time difference between a transmission time and a reception time. The GPS module 165 may calculate a current location of the flexible apparatus 100 in a calculating method such as trilateration considering the calculated distance between each of the plurality of satellites and the receiver, and locations of the satellites.

The DMB receiver 166 receives a DMB signal and processes the DMB signal.

The storage 150 may store information on a bending state of the flexible apparatus 100. The information on the bending state may include at least one of a bending area, a bending angle, and a bending direction of the flexible apparatus 100. Specifically, when the flexible apparatus 100 is bent, the controller 130 stores information on the bending state in the storage 150, and, when a predetermined input is received, controls to hold the bending state of the flexible apparatus 100 using the stored information. The controlling of the flexible apparatus 100 to hold the bending state has been described above with reference to FIGS. 7A and 7B and thus a redundant explanation is omitted.

The storage 150 may include a storage medium of at least one type of a flash memory type, a hard disk type, a multimedia card micro type, a card type memory (e.g., a Secure Digital (SD), XD memory, or the like), a Random-Access Memory (RAM), a Read-Only Memory (ROM), or the like.

In this case, the storage medium of each type may be implemented by using flexible material. However, various embodiments of the present disclosure should not be considered to be limited to the above-identified configurations.

The power supply 180 supplies power to each element of the flexible apparatus 100. The power supply 180 may include an anode collector, an anode electrode, an electrolyte, a cathode electrode, a cathode collector, and a sheath enclosing the aforementioned elements. The power supply 180 may be implemented by using a secondary cell which can be charged or discharge electricity.

The audio processor 170 processes audio data. The audio processor 170 may perform various processing operations such as decoding, amplification, and noise filtering with respect to the audio data.

The video processor 175 processes video data. The video processor 175 may perform various image processing operations such as decoding, scaling, noise filtering, frame rate conversion, resolution conversion, and/or the like with respect to the video data. In particular, the video processor 175 may scale the screen according to a size of an activated split area, or may change a resolution.

The display 140 may display various screens or objects under the control of the controller 130. For example, the controller 130 performs signal processing with respect to various images, texts, moving images, and/or the like stored in the storage 150 in the format that may be processed by the display 140 through the audio processor 170 and the video processor 175, and displays the various images, texts, moving images, and/or the like on the display 140.

The controller 130 may display a GUI to receive various user commands on the display 140. For example, the controller 130 may display a GUI to receive a user command to hold the bending state of the flexible apparatus 100 or a user command to unfix the bent flexible apparatus 100 on the display 140.

The speaker 185 outputs various notification sounds or voice messages as well as various audio data processed by the audio processor 170.

The button 191 may be implemented by using various kinds of buttons such as a mechanical button, a touch pad, a wheel, and/or the like which are formed on a certain area of the flexible apparatus 100, such as a front surface, a side surface, and a bottom surface of a body exterior of the flexible apparatus 100.

Through the button 191, various user manipulations to control the operation of the flexible apparatus 100 such as power on/off commands may be received. For example, through the button 191, a user manipulation to hold the bending state of the flexible apparatus 100 and a user manipulation to unfix the bent flexible apparatus 100 may be received.

The USB port 192 is a port to which a USB memory or a USB connector is connected, and the flexible apparatus 100 may receive various content from external apparatuses or may transmit content to external apparatuses through the USB port 192.

The camera 193 is an element that captures a still image or a moving picture according to control of the user. The camera 193 may be disposed on the front surface or rear surface of the flexible apparatus 100.

The microphone 194 is an element that receives a user's voice or other sounds and converts them into audio data. The controller 130 may use the user's voice input through the microphone 194 for a call process or may convert the user voice to audio data and store the audio data in the storage 150.

When the camera 193 and the microphone 194 are provided, the controller 130 may perform control operations according to a user voice which is input through the microphone 194 or a user motion which is recognized by the camera 193. For example, the flexible apparatus 100 may be operated in a motion control mode or a voice control mode.

For example, in the motion control mode, the controller 130 activates the camera 193 and captures a user, traces a change in the user motion, and performs a control operation such as holding the bending state of the flexible apparatus 100 or unfixing the bent flexible apparatus 100. In the voice control mode, the controller 130 may analyze a user voice input through the microphone 194 and perform a control operation such as holding the bending state of the flexible apparatus 100 or unfixing the bent flexible apparatus 100 according to the analyzed user voice.

In addition, the flexible apparatus 100 may further include various external input ports to be connected to various external terminals such as a headset, a mouse, a Local Area Network (LAN), and/or the like.

The above-described operation of the controller 130 may be performed by a program which is stored in the storage 150. The storage 150 may store Operating System (O/S) software to drive the flexible apparatus 100, various applications, various data which is input or set when an application is executed, and various data such as content.

The controller 130 controls the overall operation of the flexible apparatus 100 using various programs stored in the storage 150.

The controller 130 includes a Random Access memory (RAM) 131, a Read Only Memory (ROM) 132, a main Central Processing Unit (CPU) 133, a graphic processor 134, first to nth interfaces 135-1~135-n, and a bus 136.

The RAM 131, the ROM 132, the main CPU 133, the graphic processor 134, and the first to the nth interfaces 135-1~135-n may be connected to one another through the bus 136.

The first to the nth interfaces 135-1~135-n are connected to the above-described various elements. At least one of the first to the nth interfaces 135-1~135-n may be a network interface which is connected to an external apparatus through a network.

The main CPU 133 accesses the storage 150 and performs booting using the O/S stored in the storage 150. The main CPU 133 performs various operations using the various programs, content, and data stored in the storage 150.

The ROM 132 stores a set of commands to boot the system. When a turn on command is input and power is supplied, the main CPU 133 copies the O/S stored in the storage 140 to the RAM 131 according to a command stored in the ROM 132, executes the O/S and boots the system. When the booting is completed, the main CPU 133 copies the various applications stored in the storage 140 into the RAM 131, executes the applications copied into the RAM 131, and performs various operations.

The graphic processor 134 generates various screens under the control of the main CPU 133.

The graphic processor 134 calculates a display state value on the screen. The display state value may be an attribute value indicating a coordinate value of a location at which an object is to be displayed on the screen, and shape, size, and color of the object. When the display state value is calculated, the graphic processor 134 performs rendering based on the value, and generates a screen.

The configuration of the flexible display apparatus 100 illustrated in FIG. 12 is merely an illustrative example. According to various embodiments of the present disclosure, some of the elements illustrated in FIG. 12 may be omitted or modified, or another element may be added.

As described above, the controller 130 may perform various operations by executing a program stored in the storage 140.

Figure 14:
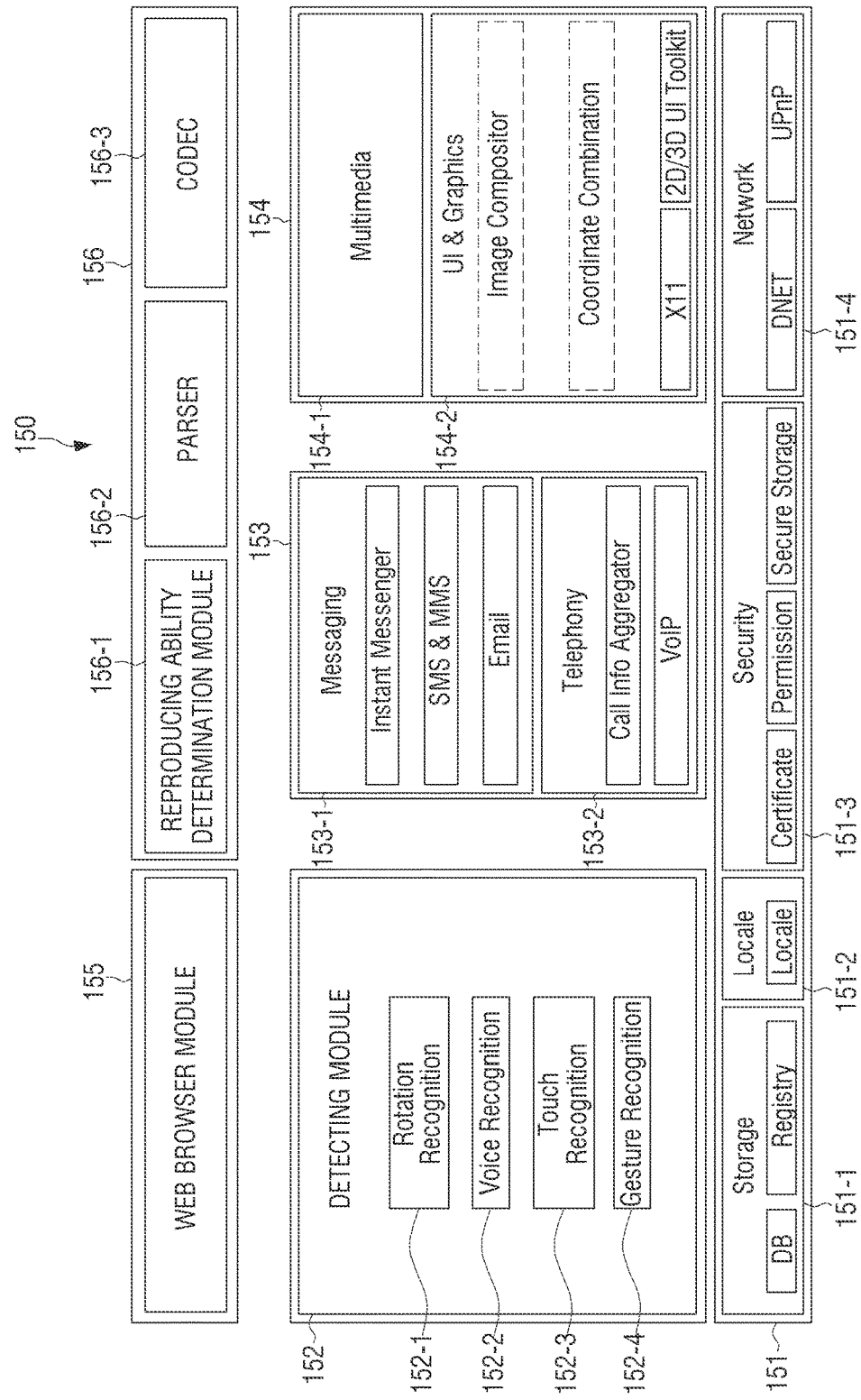
FIG. 14 is a view to illustrate a hierarchy of software which is stored in a storage according to an embodiment of the present disclosure.

FIG. 14 is a view to explain a hierarchy of software stored in a storage according to an embodiment of the present disclosure.

Referring to FIG. 14, the storage 150 includes a base module 151, a detecting module 152, a communication module 153, a presentation module 154, a web browser module 155, and a content processing module 156.

The base module 151 refers to a module which processes signals transmitted from each hardware included in the flexible apparatus 100 and which transmits the signals to an upper layer module.

The base module 151 includes a storage module 151-1, a location-based module 151-2, a security module 151-3, and a network module 151-4.

The storage module 151-1 is a program module which manages a Database (DB) or a registry. The main CPU 133 may access the database in the storage 150 using the storage module 151-1, and may read out various data. The location-based module 151-2 is a program module which is interlocked and/or interacts with various hardware such as a GPS chip and supports a location-based service. The security module 151-3 is a program module which supports certification for hardware, permission of a request, and a secure storage. The network module 151-4 is a module to support network connection, and includes a Distributed.net (DNET) module and a Universal Plug and Play (UPnP) module.

The detecting module 152 is a module which manages information on an external input and an external device, and uses the same. The detecting module 152 includes a rotation recognition module 152-1, a voice recognition module 152-2, a touch recognition module 152-3, and a gesture recognition module 152-4. The rotation recognition module 152-1 is a program for calculating a rotation angle and a rotation direction using detecting values detected by the sensors such as the geomagnetic sensor 111, the gyro sensor 112, and/or the like. The voice recognition module 152-2 is a program for analyzing a voice signal collected through the microphone 194 and extracting a user's voice. The touch recognition module 152-3 is a program for detecting touch coordinates using detecting values detected by the touch sensor 114, and/or the like. The gesture recognition module 152-4 is a program for analyzing an image photographed by the camera 194 and recognizing a user's gesture.

The communication module 153 is a module to communicate with an external apparatus. The communication module 153 may include a messaging module 153-1 such as a messenger program, a Short Message Service (SMS) and Multimedia Message Service (MMS) program, an email program, and/or the like. The communication module may include a telephony module 153-2 which includes a call information aggregator program module and a Voice over Internet Protocol (VoIP) module.

The presentation module 154 is a module which generates a display screen. The presentation module 154 includes a multimedia module 154-1 to reproduce content and output the content, and a User Interface (UI) and graphic module 154-2 to process a UI and graphics. The multimedia module 154-1 may include a player module, a camcorder module, a sound processing module, and/or the like. Accordingly, the multimedia module 154-1 generates a screen and a sound by reproducing various content, and reproduces the same. The UI and graphic module 154-2 may include an image compositor module to combine images, a coordinate combination module to combine coordinates on a screen to display an image and generate coordinates, an X11 module to receive various events from hardware, and a 2D/3D UI toolkit to provide a tool for configuring a UI of a 2D or 3D format.

The web browser module 155 is a module which performs web-browsing and accesses a web server. The web browser module 155 may include a web view module to render and view a web page, a download agent module to download, a bookmark module, a web-kit module, and/or the like.

The content processing module 156 refers to software for processing content stored in the storage 150. The content processing module may include a reproducing ability determination module 156-1, a parser 156-2, a codec 156-3, and/or the like. The reproducing ability determination module 156-1 is a program that is operated as an algorithm to compare reproducing ability information and content attributes. The parser 156-2 and the codec 156-3 are software that is provided to the video processor 175 to process content. The parser 156-2 is generally implemented by using software, and the codec 156-3 is implemented by using software or hardware.

In addition, the storage 150 may further include various application modules such as a navigation service module, a game module, and/or the like.

According to various embodiments of the present disclosure, some of the various program modules illustrated in FIG. 14 may be omitted, modified, or added according to type and characteristic of the flexible apparatus 100. For instance, when the flexible apparatus 100 is a smartphone, an e-book application, a game application, and other utility programs may be further included. Also, some of the program modules of FIG. 14 may be omitted.

According to various embodiments of the present disclosure, when a user manipulation to hold a bending state of the flexible apparatus 100 is input, the controller 130 may provide corresponding feedback to the user. A detailed description of this will be provided with reference to FIGS. 15A and 15B.

Figure 15A:
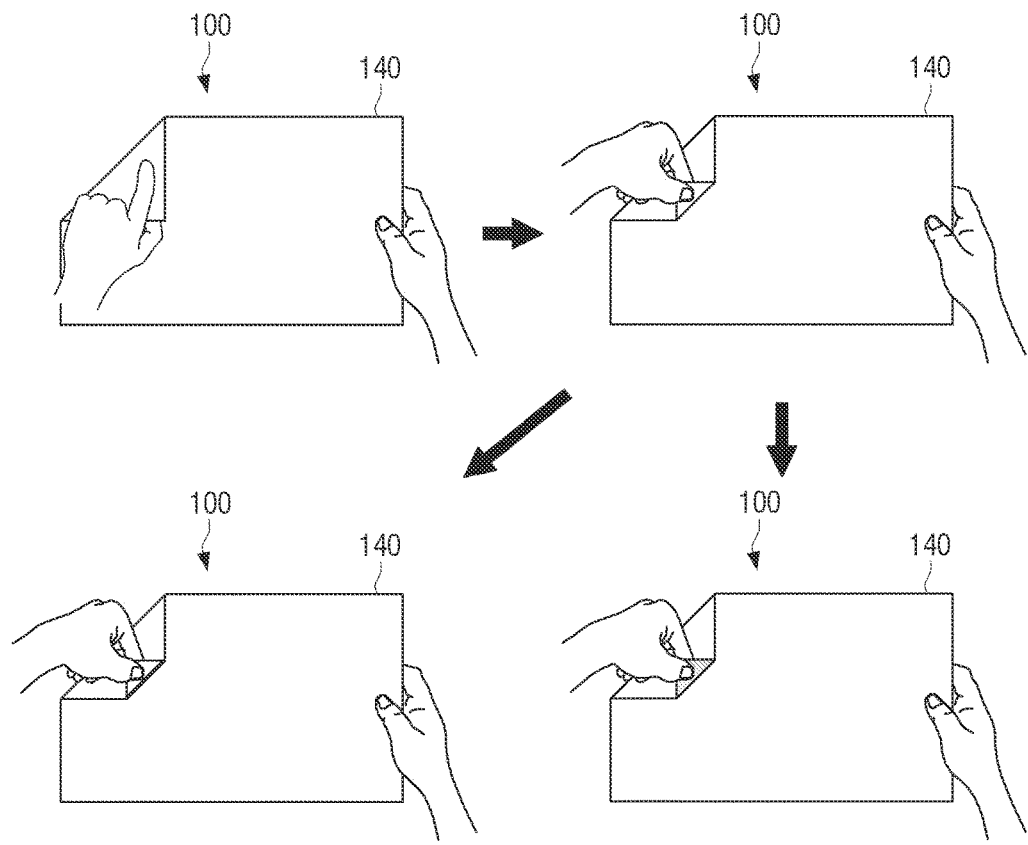
FIGS. 15A and 15B are views to illustrate a method for providing feedback of a flexible apparatus according to an embodiment of the present disclosure.
Figure 15B:
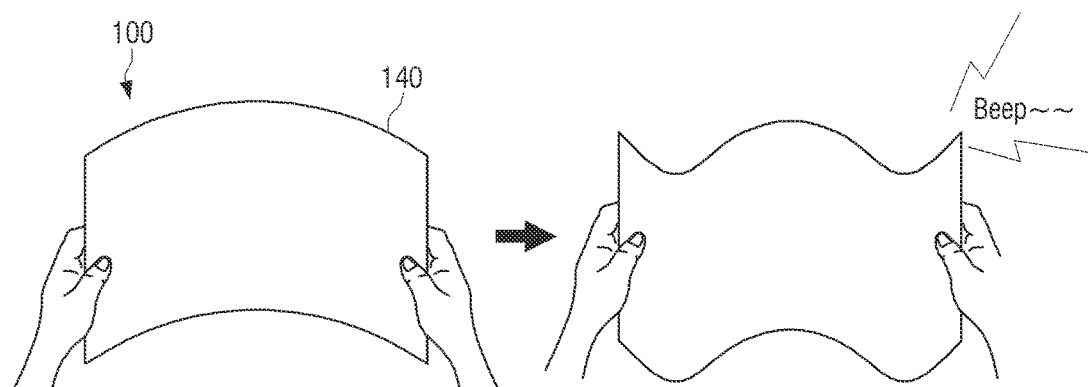

FIGS. 15A and 15B are views to illustrate a method for providing feedback of a flexible apparatus according to an embodiment of the present disclosure.

Referring to FIGS. 15A and 15B, the display 140 is assumed to be provided on one surface of the flexible apparatus 100 and to be bent along with the flexible apparatus 100.

For example, according to various embodiments of the present disclosure, as illustrated in FIG. 15A, when the display 140 is bent by a first bending manipulation and then a second bending manipulation is performed in the opposite direction to that of the first bending manipulation, the controller 130 may change color of an area that is bent by the second bending manipulation or may change color of a bending line which is formed by the second bending manipulation.

As another example, according to various embodiments of the present disclosure, as illustrated in FIG. 15B, when the display 140 is bent by the first bending manipulation and then the second bending manipulation is performed in the opposite direction to that of the first bending manipulation, the controller 130 may output a predetermined warning sound through the speaker 185. Also, the controller 130 may control to output a voice informing that the user manipulation to hold the bending state of the flexible apparatus 100 is input.

Accordingly, the user can identify that a correct bending manipulation to hold the bending state is input.

According to various embodiments of the present disclosure, when the display 140 is provided on one surface or opposite surfaces of the flexible apparatus 100, and is bent as the flexible apparatus 100 is bent and then the bending state is fixed, the controller 130 may display a screen on each area of the display 140 which is split by the bending. A detailed explanation of this will be provided with reference to FIG. 16.

Figure 16:
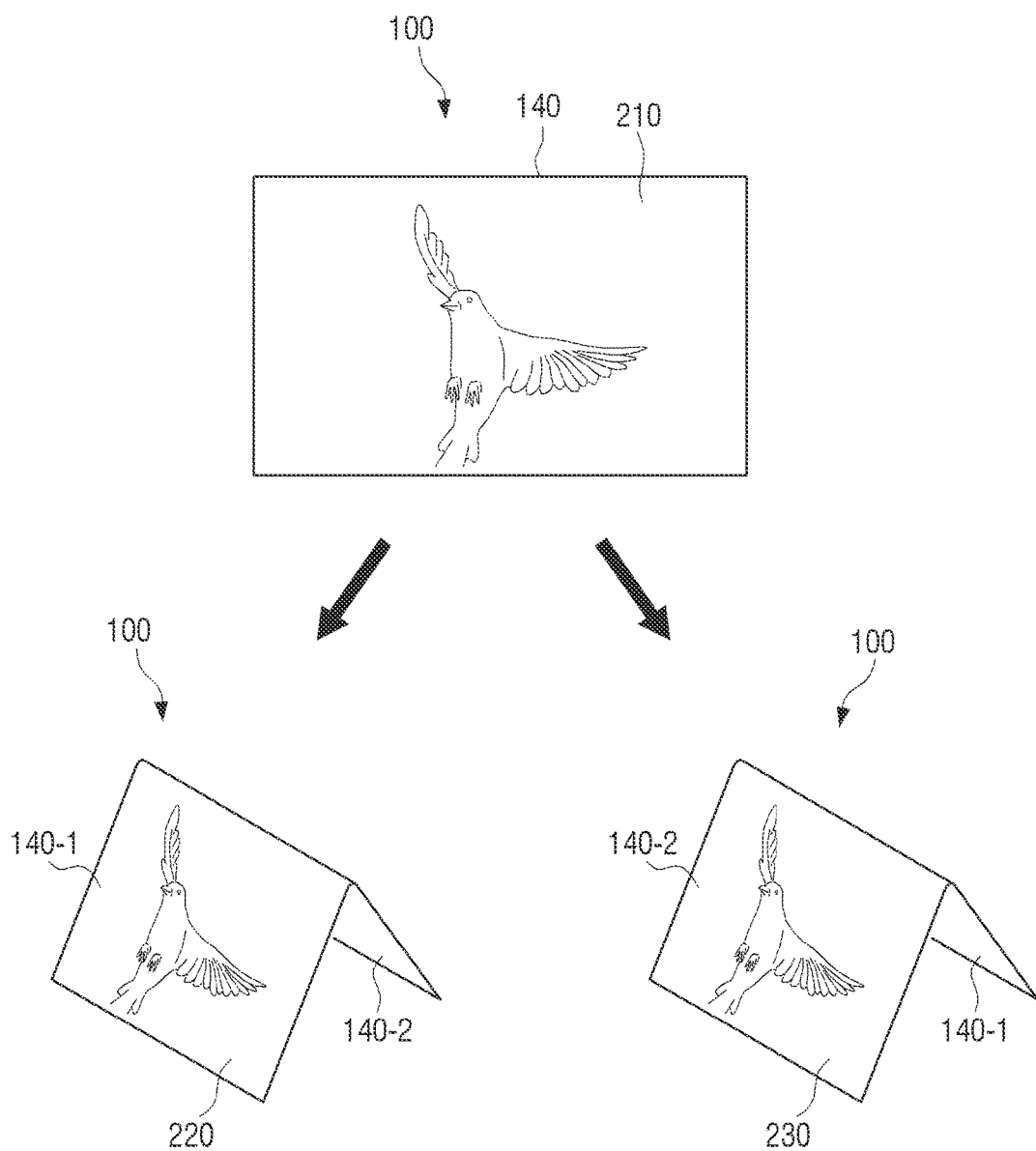
FIGS. 16, 17, and 18 are views to illustrate a method for displaying a screen when a flexible apparatus is fixed in a bending state according to an embodiment of the present disclosure.
Figure 17:
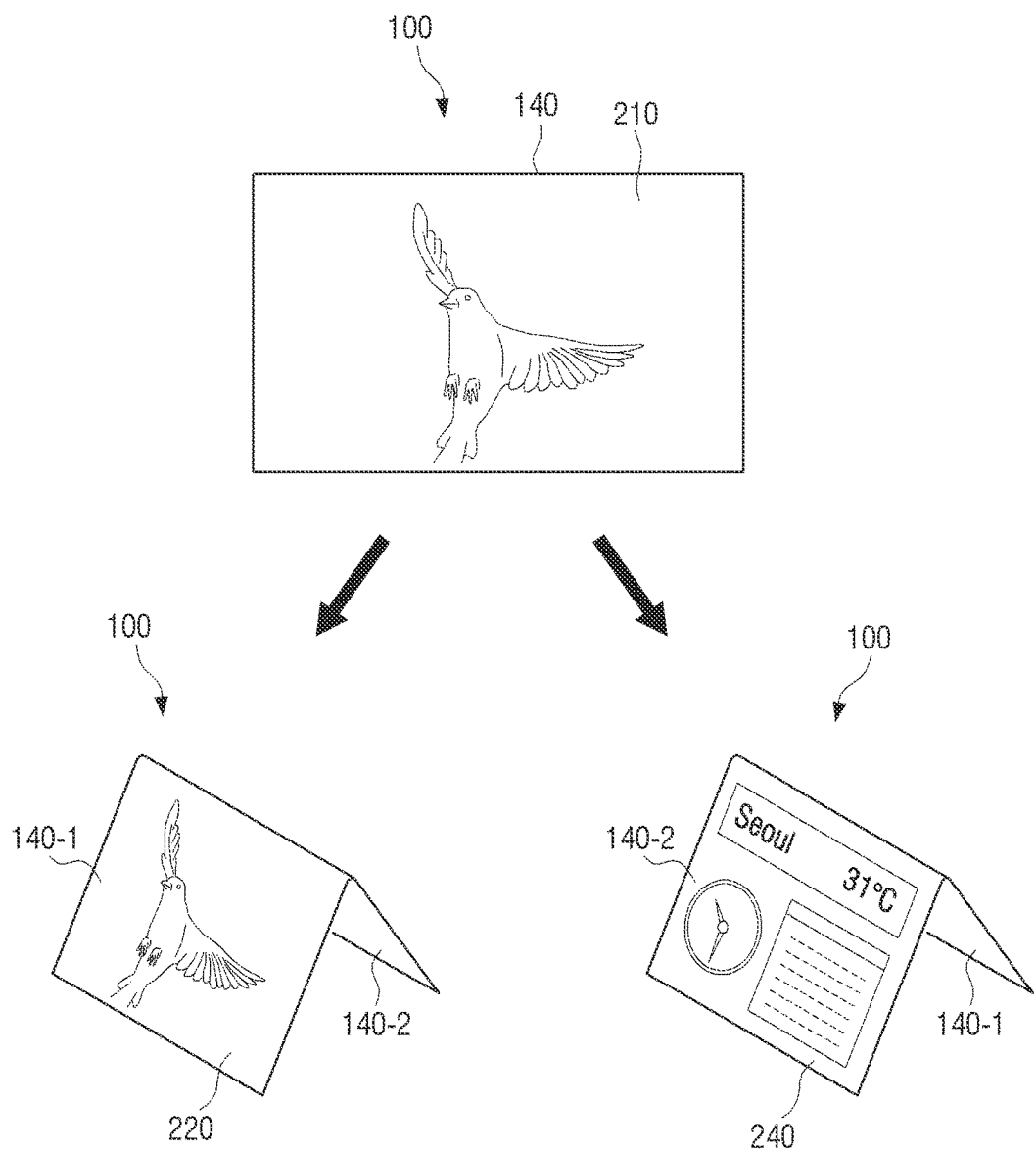
Figure 18:
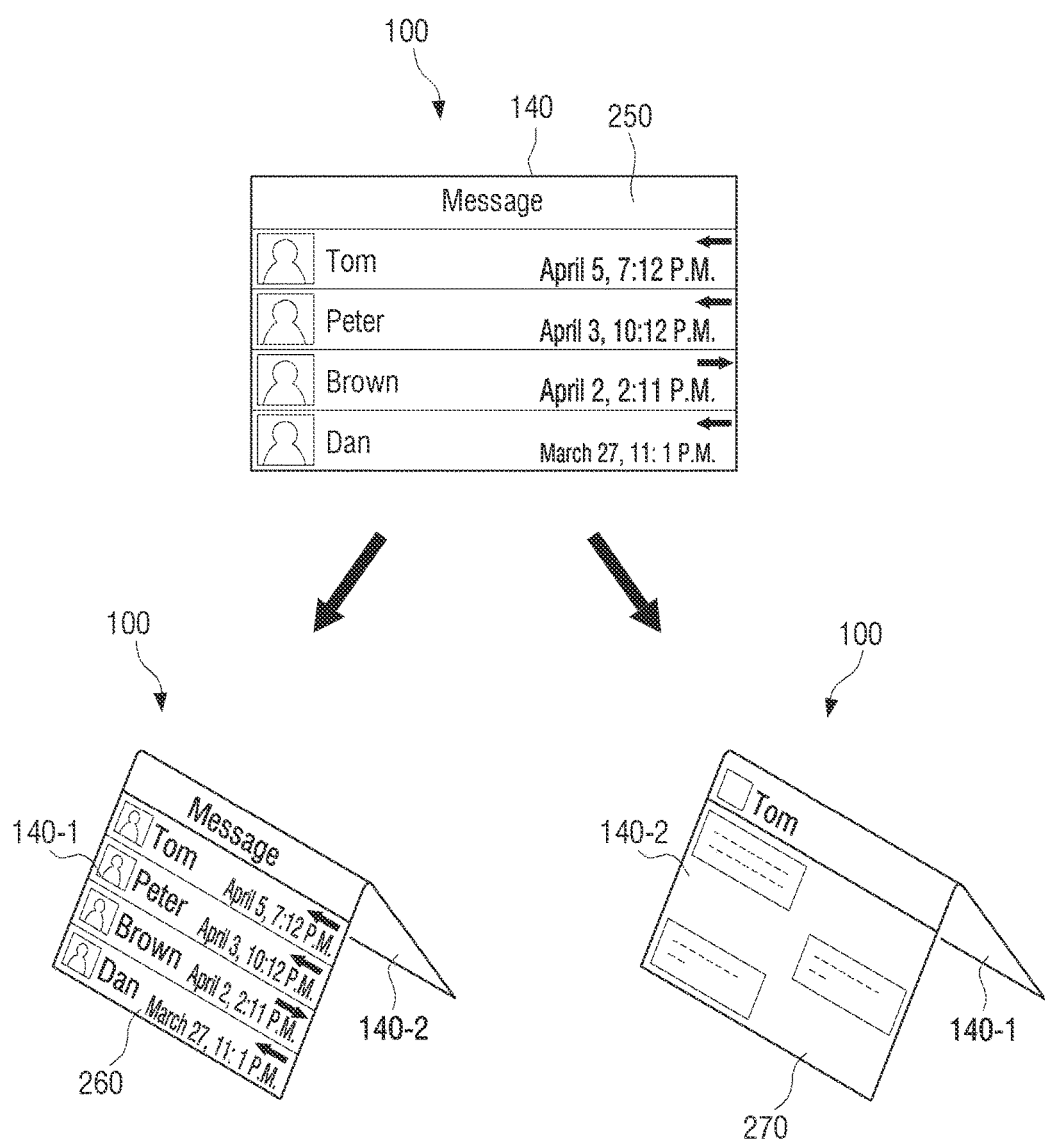

FIGS. 16, 17, and 18 are views to illustrate a method for displaying a screen when a flexible apparatus is fixed in a bending state according to an embodiment of the present disclosure.

Referring to FIGS. 16, 17, and 18, the flexible apparatus 100 is fixed, the controller 130 may split a display area of the display 140 into a plurality of display areas according to the bending state of the flexible apparatus 100, and may display a screen on each of the plurality of display areas.

Specifically, the controller 130 splits the display 140 into two areas with reference to a bending line which is formed by bending of the display 140, and calculates a size of each area using a location where the bending line is formed. The controller 130 may scale the screen according to the calculated size and may display the screen.

At this time, the controller 130 may display the same screen or different screens on the split areas.

For example, as illustrated in FIGS. 16 and 17, the display 140 on which an image 210 is displayed may be assumed to be bent and the bending state may be assumed to be fixed according to a user manipulation.

In this case, as shown in FIG. 16, the controller 130 reduces a size of the image 210 according to a size of a first split area 140-1 and a second split area 140-2, and displays the reduced images 220 and 230 on the first split area 140-1 and the second split area 140-2, respectively.

According to various embodiments of the present disclosure, as shown in FIG. 17, the controller 130 may reduce the size of the image 210 and display the reduced image 220 on the first split area 140-1. However, the controller 130 may display a widget screen 240 including a weather widget, a time widget, and a memo widget on the second split area 140-2. For example, according to various embodiments of the present disclosure, the controller 130 may control to display different images or screens on the various split areas (e.g., the first split area 140-1 and the second split area 140-2). According to various embodiments of the present disclosure, the controller 130 may use the split areas defined by the bend as areas in which to display a corresponding screen which may be unrelated to or otherwise independent from a screen displayed on another of the split areas.

According to various embodiments of the present disclosure, when an application is executed and an application execution screen is displayed on the display 140, the controller 130 may display a main menu and a sub menu of the executed application on the split areas.

For example, as illustrated in FIG. 18, the display 140 may be assumed to be bent and fixed when a message application is driven, and a list 250 including the other users and details of message exchange may be displayed on the display 140. In this case, the controller 130 may reduce a size of the list 250 of details of message exchange and display the reduced list 260 on the first split area 140-1, and may display a screen 270 including messages that the user exchanges with a specific user on the second split area 140-2. For example, the controller 130 may display the message screen 270, which is a sub menu of the list 250, on the second split area 140-2.

Figure 19:
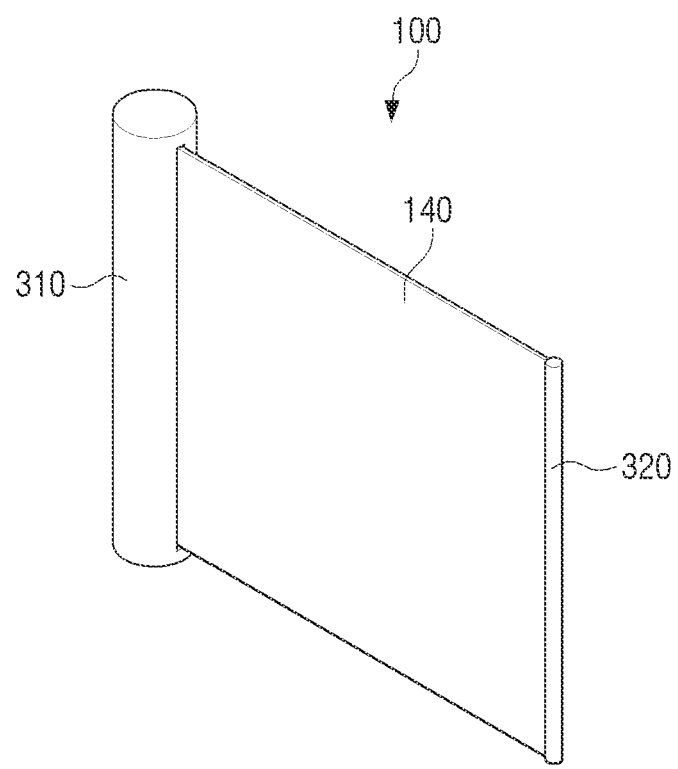
FIG. 19 is a view to illustrate an example of a shape of a flexible apparatus according to an embodiment of the present disclosure.

FIG. 19 is a view illustrating an example of a shape of a flexible apparatus according to an embodiment of the present disclosure.

Referring to FIG. 19, the flexible apparatus 100 includes a body 310, a display 140, and a grip part 320.

The body 310 may serve as a case including the display 140. The body 310 includes a rotary roller for rolling the display 140. Accordingly, when not in use, the display 140 may be rolled about the rotary roller and embedded in the body 310.

When the user holds the grip part 320 and pulls the display 140, the rotary roller is rotated in the opposite direction to that of the rolling and rolling is released, so that the display 140 extracted from the body 310 such that the display is outside of the body 310. A stopper may be provided on the rotary roller. Accordingly, when the user pulls the grip part 320 by more than a predetermined distance, the rotation of the rotary roller is stopped by the stopper and the display 140 may be fixed.

According to various embodiments of the present disclosure, when the user presses a button (not shown) of the body 310 to release the stopper, the stopper is released and the rotary roller is rotated in a reverse direction. As a result, the display 140 is rolled in the body 310. The stopper may have a switch shape to stop an operation of a gear to rotate the rotary roller. Because the rotary roller and the stopper may employ a rolling structure according to the related art, a detailed illustration and explanation thereof are omitted.

According to various embodiments of the present disclosure, the body 310 includes a power supply (not shown). The power supply (not shown) may be implemented by using a battery connector on which a disposable battery is mounted, a secondary cell which can be charged and used multiple times by the user, and a solar cell which generates electricity using solar heat. When the power supply is implemented by using the secondary cell, the user may connect the body 310 to an external power source through a wire and may charge the power supply (not shown).

As illustrated in FIG. 19, the body 310 has a cylindrical shape. However, according to various embodiments of the present disclosure, the shape of the body 3100 may be quadrangular, another polygonal shape, or the like.

Figure 20:
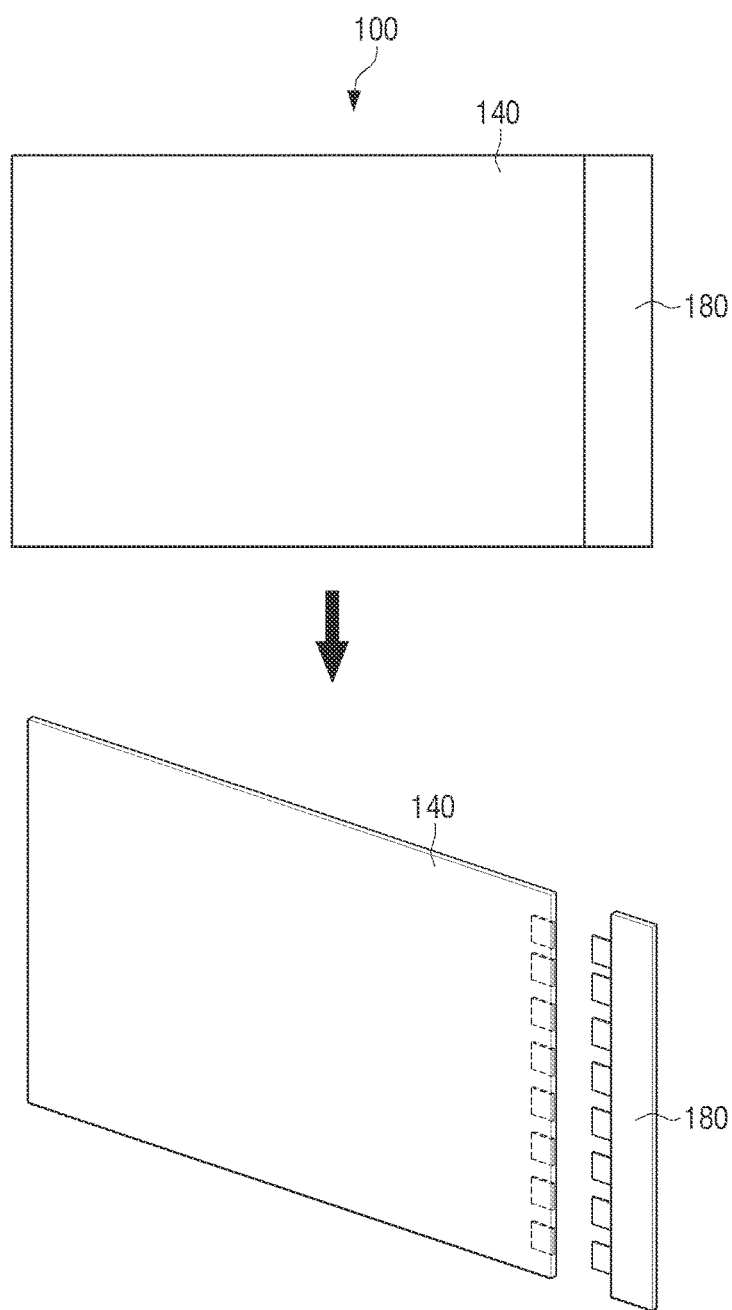
FIG. 20 is a view to illustrate an example of a shape of a flexible apparatus according to an embodiment of the present disclosure.

FIG. 20 is a view illustrating an example of a shape of a flexible apparatus according to an embodiment of the present disclosure.

Referring to FIG. 20, a power supply 180 is provided on one edge of the flexible apparatus and is attachable and detachable.

The power supply 180 is made of flexible material and can be bent along with the display 140. Specifically, the power supply 180 includes a cathode collector, a cathode electrode, an electrolyte, an anode electrode, an anode collector, and a sheath covering the aforementioned members.

For example, the collector may be implemented by using an alloy such as TiNi having good elasticity, metal such as copper and aluminum, a conductive material such as metal coated with carbon, carbon, and a carbon fiber, a conducting polymer, such as polypyrole, and/or the like.

The cathode electrode may be manufactured by a negative electrode material such as metal such as lithium, natrium, zinc, magnesium, cadmium, hydrogen storage alloy, and lead, nonmetal such as carbon, and a high polymer electrode material such as organosulfur, and/or the like.

The anode electrode may be manufactured by a positive electrode material such as sulfur and metal sulfide, lithium transition metal oxide such as LiCoO2, and a polymer electrode material such as SOC2, MnO2, Ag2O, Cl2, NiCl2, NiOOH, and/or the like. The electrolyte may be implemented in a gel form using PEO, PVdF, PMMA, and PVAC.

The sheath may use a general polymer resin. For example, PVC, HDPE, or epoxy, and/or the like may be used. In addition, any material that can prevent damage of a thread-type cell and that is freely flexible or bendable may be used for the sheath.

Each of the anode electrode and the cathode electrode in the power supply 180 may include a connector to be electrically connected to an external source.

Referring to FIG. 20, the connector protrudes from the power supply 180 and a recess corresponding to a location, a size, and a shape of the connector is formed on the display 140. Accordingly, the power supply 180 is connected with the display 140 as the connector and the recess are connected to each other. The connector of the power supply 180 is connected to a power connection pad (not shown) of the flexible apparatus 100 to supply power to the flexible apparatus 100.

Although the power supply 180 is attached to or detached from one edge of the flexible apparatus 100 in FIG. 20, such a configuration is merely an example. According to various embodiments of the present disclosure, a location and a shape of the power supply 180 may be changed according to a product characteristic. For example, when the flexible apparatus 100 has a predetermined thickness, the power supply 180 may be mounted on the rear surface of the flexible apparatus 100.

Figure 21:
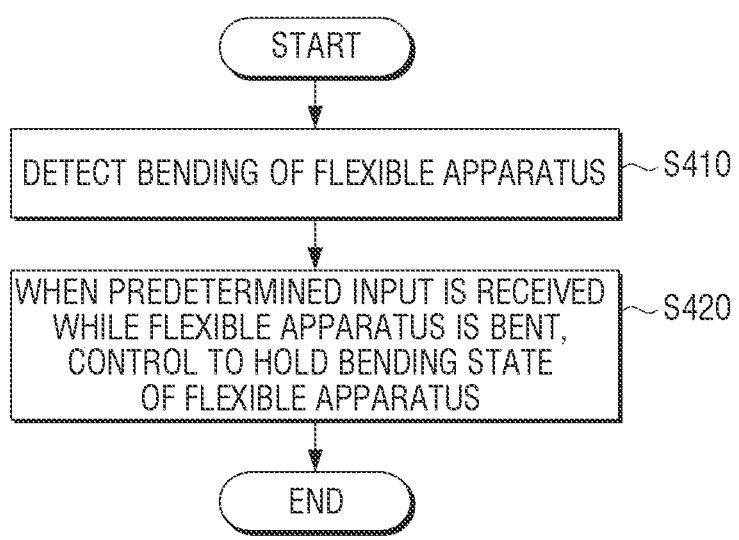
FIG. 21 is a flowchart to illustrate a method for controlling of a flexible apparatus according to an embodiment of the present disclosure.

FIG. 21 is a flowchart to illustrate a method for controlling of a flexible apparatus according to an embodiment of the present disclosure.

Referring to FIG. 21, at operation S410, bending of the flexible apparatus is detected.

Thereafter, at operation S420, when a predetermined input is received while the flexible apparatus is bent, the bending state of the flexible apparatus is held.

Specifically, information on the bending state of the flexible apparatus is stored, and, when the predetermined input is received, the bending state of the flexible apparatus is held using the stored information. The information on the bending state may include at least one of a bending area, a bending angle, and a bending direction of the flexible apparatus. This has been described above with reference to FIGS. 7A and 7B.

According to various embodiments of the present disclosure, when the flexible apparatus is bent and then is re-bent in a direction opposite to a direction in which the flexible apparatus is bent within a predetermined time, the bending state of the flexible apparatus is held.

For example, when a first bending manipulation is performed in a first direction in which a center area of the flexible apparatus curves upwardly or downwardly, and a second bending manipulation is performed on an edge area of the flexible apparatus in a second direction which is opposite to the first direction within a predetermined time, the bending state of the flexible apparatus is held.

In contrast, according to various embodiments of the present disclosure, when an unfixing command is input while the flexible apparatus is bent, the flexible apparatus may return to a flat state. The unfixing command may be input by at least one of a button manipulation to select a button provided on a body of the flexible apparatus and a bending manipulation to bend a predetermined area of the flexible apparatus. However, such a configuration should not be considered as limiting and the unfixing command may be input according to various methods.

According to various embodiments of the present disclosure, when the flexible apparatus includes a bendable display, and the flexible apparatus is fixed, a display area of the display may be split into a plurality of display areas according to the bending state of the flexible apparatus, and a screen may be displayed on each of the plurality of display areas. Such a configuration has been described above with reference to FIGS. 16 to 18.

According to various embodiments of the present disclosure, a non-transitory computer readable medium, which stores a program that performs the control method according to various embodiments of the present disclosure, may be provided.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a Compact Disc (CD), a Digital Versatile Disk (DVD), a hard disk, a Blu-ray disk, a Universal Serial Bus (USB), a memory card, and a Read Only Memory (ROM), and may be provided.

In the block diagram of the display apparatus, a bus is not illustrated. However, the elements of the display apparatus may communicate with one another through a bus. Also, the display apparatus may further include a processor such as a CPU and a micro processor to perform the above-described various operations.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible apparatus comprising:
   a bendable display;
   a sensor configured to detect bending of the flexible apparatus;
   a bending holder configured to maintain a bending state of the flexible apparatus by a voltage applied to the bending holder; and
   a processor configured to:
     in response to the flexible apparatus being bent to the bending state by an external force, detect the bending state of the flexible apparatus through the sensor and count a time for which the bending state is maintained by the external force,
     determine whether the counted time is greater than or equal to a predefined time, and
     in response to determining that the counted time is greater than or equal to the predefined time, apply a voltage to the bending holder to maintain the bending state.

2. The flexible apparatus of claim 1, further comprising:
   a storage configured to store information relating to the bending state,
   wherein, when the flexible apparatus is bent to the bent state, the processor is further configured to:
     store the information relating to the bending state in the storage, and
     when the bending state is maintained for the predefined time, maintain the bending state of the flexible apparatus using the stored information.

3. The flexible apparatus of claim 2, wherein the sensor is further configured to detect at least one of a bending area, a bending angle, and a bending direction of the flexible apparatus.

4. The flexible apparatus of claim 1, wherein, when the flexible apparatus is bent and then is re-bent in a direction opposite to a direction in which the flexible apparatus is bent during the predefined time, the processor is further configured to apply the voltage to the bending holder to maintain the bending state of the flexible apparatus.

5. The flexible apparatus of claim 1, wherein, when a first bending manipulation is performed in a first direction in which a center area of the flexible apparatus curves upwardly or downwardly, and a second bending manipulation is performed on an edge area of the flexible apparatus in a second direction which is opposite to the first direction within the predefined time, the processor is further configured to apply the voltage to the bending holder to maintain the bending state of the flexible apparatus.

6. The flexible apparatus of claim 5, wherein the processor is further configured to apply the voltage to the bending holder to maintain the bending state of the flexible apparatus according to a first bending manipulation.

7. The flexible apparatus of claim 1, wherein, when an unfixing command is input while the flexible apparatus is bent to the bending state, the processor is further configured to apply another voltage to the bending holder to return the flexible apparatus to a flat state.

8. The flexible apparatus of claim 7, wherein the unfixing command is input by at least one of a button manipulation to select a button provided on a body of the flexible apparatus and a bending manipulation to bend a predetermined area of the flexible apparatus.

9. A method for controlling of a flexible apparatus, the method comprising:
   in response to the flexible apparatus being bent to a bending state by an external force, detecting the bending state of the flexible apparatus through a sensor and counting a time for which the bending state is maintained by the external force;
   determining whether for the counted time is greater than or equal to a predefined time; and
   in response to determining that the counted time is greater than or equal to the predefined time, applying a voltage to a bending holder to maintain the bending state.

10. The method of claim 9, wherein the controlling to maintain the bending state of the flexible apparatus comprises:
    storing information relating to the bending state; and
    when the bending state is maintained for the predefined time, controlling to maintain the bending state of the flexible apparatus using the stored information.

11. The method of claim 10, wherein the detecting of the bending of the flexible apparatus comprises sensing at least one of a bending area, a bending angle, and a bending direction of the flexible apparatus via the sensor.

12. The method of claim 9, further comprising, when the flexible apparatus is bent and then is re-bent in a direction opposite to a direction in which the flexible apparatus is bent during the predefined time, applying the voltage to the bending holder to maintain the bending state.

13. The method of claim 9, wherein the controlling to maintain the bending state comprises:
    when a first bending manipulation is performed in a first direction in which a center area of the flexible apparatus curves upwardly or downwardly, and a second bending manipulation is performed on an edge area of the flexible apparatus in a second direction which is opposite to the first direction within the predefined time, applying the voltage to the bending holder to maintain the bending state of the flexible apparatus.

14. The method of claim 13, wherein the bending state of the flexible apparatus is maintained according to a first bending manipulation.

15. The method of claim 9, further comprising, when an unfixing command is input while the flexible apparatus is bent, applying another voltage to the bending holder to return the flexible apparatus to a flat state.

16. The method of claim 15, wherein the unfixing command is input by at least one of a button manipulation to select a button provided on a body of the flexible apparatus and a bending manipulation to bend a predetermined area of the flexible apparatus.

17. A non-transitory computer-readable storage medium storing instructions that, when executed, cause at least one processor to perform the method of claim 9.

* * * * *